US012581397B2

(12) United States Patent
Singh et al.

(10) Patent No.: US 12,581,397 B2
(45) Date of Patent: Mar. 17, 2026

(54) DISTRIBUTED WIRELESS LOCAL AREA NETWORK SCAN FOR LOW LATENCY APPLICATIONS

(71) Applicant: QUALCOMM Incorporated, San Diego, CA (US)

(72) Inventors: Sudhanshu Singh, Hyderabad (IN); Sriman Miryala, Hyderabad (IN); Santhi Swaroop Golti, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 553 days.

(21) Appl. No.: 18/164,500

(22) Filed: Feb. 3, 2023

(65) Prior Publication Data

US 2024/0267834 A1 Aug. 8, 2024

(51) Int. Cl.
| *H04W 4/00* | (2018.01) |
| *H04W 48/16* | (2009.01) |
| *H04W 84/12* | (2009.01) |

(52) U.S. Cl.
CPC ............ *H04W 48/16* (2013.01); *H04W 84/12* (2013.01)

(58) Field of Classification Search
CPC .................................................... H04W 48/16
USPC ......................................................... 370/338
See application file for complete search history.

(56) References Cited

U.S. PATENT DOCUMENTS

| 10,979,885 | B1 * | 4/2021 | Shukla ................ H04W 40/246 |
| 2017/0034707 | A1 * | 2/2017 | Green ..................... G01S 7/021 |
| 2019/0141620 | A1 | 5/2019 | Pujari et al. |
| 2019/0320407 | A1 | 10/2019 | Goyal et al. |
| 2020/0112845 | A1 * | 4/2020 | Zhao ....................... H04L 51/58 |
| 2023/0030603 | A1 * | 2/2023 | Vakil ..................... H04W 76/11 |

OTHER PUBLICATIONS

International Search Report and Written Opinion—PCT/US2023/082243—ISA/EPO—Mar. 7, 2024.

* cited by examiner

*Primary Examiner* — Temica M Beamer

(74) *Attorney, Agent, or Firm* — Holland & Hart LLP

(57) ABSTRACT

This disclosure provides methods, components, devices and systems for a distributed wireless local area network (WLAN) scan for low latency applications. Some aspects more specifically relate to a first wireless communication device, such as a station, splitting a set of channels to scan into different subsets for scanning by one or more connected wireless communication devices in proximity to the wireless communication device. The first wireless communication device may indicate one or more of the subsets of channels to the connected wireless communication device in proximity to the first wireless communication device for scanning, and the first wireless communication device may receive results of the scanning of the subset of channels from the connected wireless communication device.

30 Claims, 14 Drawing Sheets

Channel
List

| First Device 604 | List 1 615 | | |
|---|---|---|---|
| Left Earbud 610-a | List 2a 620 | List 3a 630 | List 4a 640 |
| Right Earbud 610-b | List 2b 625 | List 3b 635 | List 4b 645 |

Time

600

815

First Wireless
Communication
Device 804

Second Wireless
Communication
Device 810

Control signaling to scan
a subset of channels

820

Scanning the
subset of
channels

825

Result of scanning the
subset of channels

Indication that a measured
received signal strength indicator
value satisfies a threshold level

830

835

Identify a channel to
initiate a connection
procedure

800

905

900

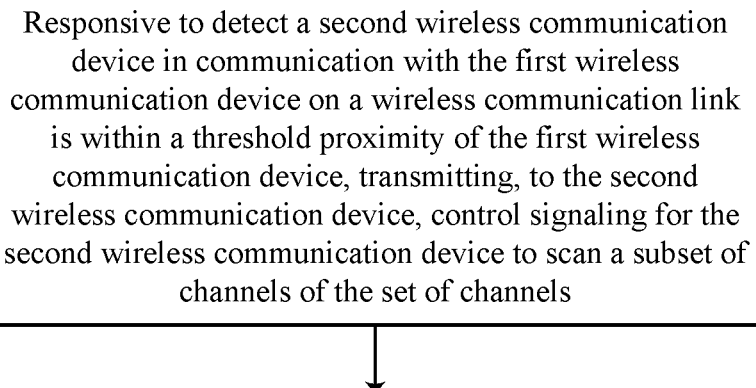

Responsive to detect a second wireless communication device in communication with the first wireless communication device on a wireless communication link is within a threshold proximity of the first wireless communication device, transmitting, to the second wireless communication device, control signaling for the second wireless communication device to scan a subset of channels of the set of channels ⟋ 1305

Receive, from the second wireless communication device on the wireless communication link, at least one result of scanning the subset of channels ⟋ 1310

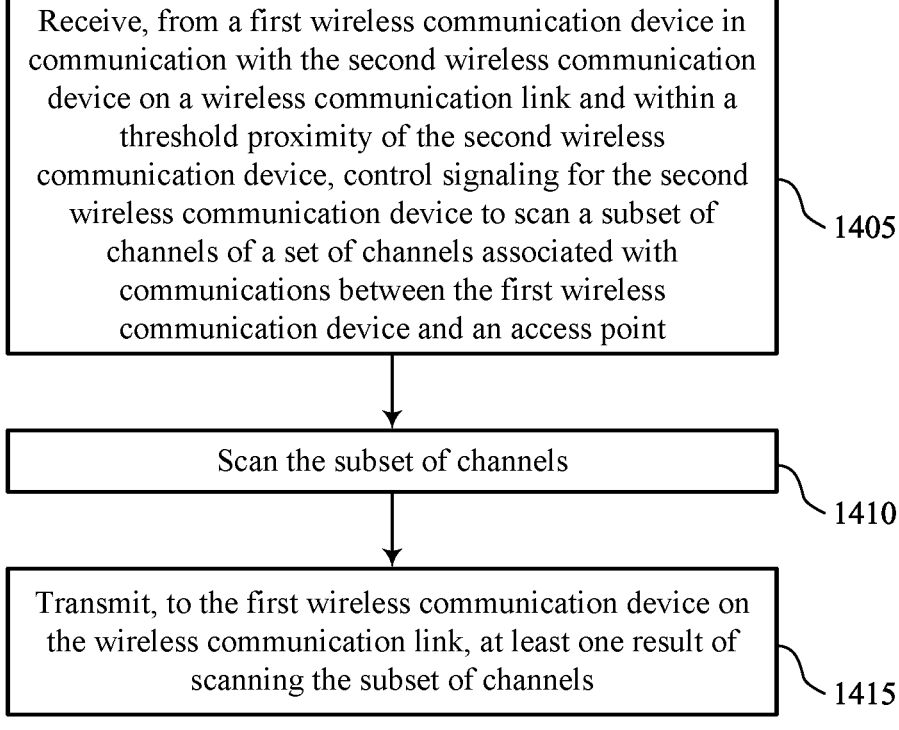

Receive, from a first wireless communication device in communication with the second wireless communication device on a wireless communication link and within a threshold proximity of the second wireless communication device, control signaling for the second wireless communication device to scan a subset of channels of a set of channels associated with communications between the first wireless communication device and an access point

1405

Scan the subset of channels

1410

Transmit, to the first wireless communication device on the wireless communication link, at least one result of scanning the subset of channels

DISTRIBUTED WIRELESS LOCAL AREA NETWORK SCAN FOR LOW LATENCY APPLICATIONS

BACKGROUND

The following relates to wireless communications, including distributed wireless local area network (WLAN) scan for low latency applications.

A WLAN may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

After the STA has established the communication link with the AP, the STA may identify that the STA should connect with a different AP. The STA may scan a set of channels to identify a channel on which the STA may connect with the different AP. Scanning the set of channels consumes time and resources of the STA. In communications that demand low latency, the time for the STA to scan the set of channels may impact the low latency communications and insufficient time may be available to scan the set of channels.

SUMMARY

The systems, methods and devices of this disclosure each have several innovative aspects, no single one of which is solely responsible for the desirable attributes disclosed herein.

The described techniques relate to improved methods, systems, devices, or apparatuses that support distributed wireless local area network (WLAN) scan for low latency applications. Generally, the described techniques provide for a first wireless communication device, such as a station (STA), to split a set of channels to scan into different subsets for scanning by one or more connected wireless communication devices in proximity to the first wireless communication device. In response to a triggering condition for scanning a set of channels, the STA may split the set of channels into subsets of channels. The first wireless communication may transmit control signaling indicating one or more of the subsets of channels to the wireless communication device in proximity to the first wireless communication for scanning, and the first wireless communication may receive results of the scanning of the subset of channels from the wireless communication device in proximity to the STA.

A method for wireless communications at a first wireless communication device is described. The method may include responsive to detecting a second wireless communication device in communication with the first wireless communication device on a wireless communication link is within a threshold proximity of the first wireless communication device, transmitting, to the second wireless communication device, control signaling for the second wireless communication device to scan a subset of channels of a set of channels and receiving, from the second wireless communication device on the wireless communication link, at least one result of scanning the subset of channels.

An apparatus for wireless communications at a first wireless communication device is described. The apparatus may include a processor, memory coupled with the processor, and instructions stored in the memory. The instructions may be executable by the processor to cause the apparatus to responsive to detect a second wireless communication device in communication with the first wireless communication device on a wireless communication link is within a threshold proximity of the first wireless communication device, transmitting, to the second wireless communication device, control signaling for the second wireless communication device to scan a subset of channels of a set of channels and receive, from the second wireless communication device on the wireless communication link, at least one result of scanning the subset of channels.

Another apparatus for wireless communications at a first wireless communication device is described. The apparatus may include means for responsive to detecting a second wireless communication device in communication with the first wireless communication device on a wireless communication link is within a threshold proximity of the first wireless communication device, transmitting, to the second wireless communication device, control signaling for the second wireless communication device to scan a subset of channels of a set of channels and means for receiving, from the second wireless communication device on the wireless communication link, at least one result of scanning the subset of channels.

A non-transitory computer-readable medium storing code for wireless communications at a first wireless communication device is described. The code may include instructions executable by a processor to responsive to detect a second wireless communication device in communication with the first wireless communication device on a wireless communication link is within a threshold proximity of the first wireless communication device, transmitting, to the second wireless communication device, control signaling for the second wireless communication device to scan a subset of channels of a set of channels and receive, from the second wireless communication device on the wireless communication link, at least one result of scanning the subset of channels.

In some examples of the method, apparatuses, and non-transitory computer-readable medium described herein, the detecting that the second wireless communication device may be with the threshold proximity may include operations, features, means, or instructions for receiving an indication that a measured received signal strength indicator (RSSI) value associated with a transmission from the second wireless communication device satisfies a threshold level.

Some examples of the method, apparatuses, and non-transitory computer-readable medium described herein may further include operations, features, means, or instructions for receiving, from an access point (AP), a request to scan the set of channels, the control signaling is transmitted to the second wireless communication device in response to a triggering condition including the request to scan the set of channels.

Some examples of the method, apparatuses, and non-transitory computer-readable medium described herein may further include operations, features, means, or instructions for communicating on a second wireless communication link with an AP, the set of channels being associated with the second wireless communication link and responsive to identifying that a signal strength associated with the second wireless communication link between the first wireless communication device and the AP may be below a threshold level, the triggering condition including the identification that the signal strength associated with the second wireless communication link may be below the threshold level, and the set of channels being associated with the second wireless communication link.

Some examples of the method, apparatuses, and non-transitory computer-readable medium described herein may further include operations, features, means, or instructions for scanning a second subset of channels of the set of channels, the second subset of channels different from the subset of channels.

In some examples of the method, apparatuses, and non-transitory computer-readable medium described herein, responsive to detecting a third wireless communication device in communication with the first wireless communication device on a third wireless communication link may be within the threshold proximity of the first wireless communication device, transmitting, to the third wireless communication device and in response to the triggering condition, second control signaling indicating for the third wireless communication device to scan a third subset of channels of the set of channels, the third subset of channels different from the subset of channels and receiving, from the third wireless communication device on the wireless communication link, at least one result of scanning the third subset of channels.

In some examples of the method, apparatuses, and non-transitory computer-readable medium described herein, the set of channels includes at least two of a set of 2 GHz channels, a set of 5 GHz channels, and a set of 6 GHz channels, the subset of channels includes one of the set of 2 GHz channels, the set of 5 GHz channels, or the set of 6 GHz channels, the second subset of channels includes a different one of the set of 2 GHz channels, the set of 5 GHz channels, or the set of 6 GHz channels, the third subset of channels includes a different one of the set of 2 GHz channels, the set of 5 GHz channels, or the set of 6 GHz channels.

In some examples of the method, apparatuses, and non-transitory computer-readable medium described herein, communication on the wireless communication link with the second wireless communication device may include operations, features, means, or instructions for communicating with the second wireless communication device during periodic service periods in accordance with a service interval, the service interval including periodic service periods and periodic idle periods, and scanning the second subset of channels includes scanning the second subset of channels during the periodic idle periods.

Some examples of the method, apparatuses, and non-transitory computer-readable medium described herein may further include operations, features, means, or instructions for identifying a channel of the set of channels to initiate a connection procedure within response to the at least one result of scanning the subset of channels.

In some examples of the method, apparatuses, and non-transitory computer-readable medium described herein, the second wireless communication device may be a wearable device.

In some examples of the method, apparatuses, and non-transitory computer-readable medium described herein, the at least one result of scanning the subset of channels includes a respective RSSI value associated with each of the subset of channels.

In some examples of the method, apparatuses, and non-transitory computer-readable medium described herein, the set of channels may be associated with communications between the first wireless communication device and an AP.

Some examples of the method, apparatuses, and non-transitory computer-readable medium described herein may further include operations, features, means, or instructions for receiving an indication of a quantity of wireless communication devices in communication with the first wireless communication device within the threshold proximity of the first wireless communication device, a quantity of channels within the subset of channels responsive to the quantity of wireless communication devices.

Some examples of the method, apparatuses, and non-transitory computer-readable medium described herein may further include operations, features, means, or instructions for transmitting, to the second wireless communication device and in response to the at least one result of scanning the subset of channels, third control signaling for the second wireless communication device to scan a fourth subset of channels of the set of channels and receiving, from the second wireless communication device on the wireless communication link, at least one result of scanning the fourth subset of channels.

A method for wireless communications at a second wireless communication device is described. The method may include receiving, from a first wireless communication device in communication with the second wireless communication device on a wireless communication link and within a threshold proximity of the second wireless communication device, control signaling for the second wireless communication device to scan a subset of channels of a set of channels associated with communications between the first wireless communication device and an AP, scanning the subset of channels, and transmitting, to the first wireless communication device on the wireless communication link, at least one result of scanning the subset of channels.

An apparatus for wireless communications at a second wireless communication device is described. The apparatus may include a processor, memory coupled with the processor, and instructions stored in the memory. The instructions may be executable by the processor to cause the apparatus to receive, from a first wireless communication device in communication with the second wireless communication device on a wireless communication link and within a threshold proximity of the second wireless communication device, control signaling for the second wireless communication device to scan a subset of channels of a set of channels associated with communications between the first wireless communication device and an AP, scan the subset of channels, and transmit, to the first wireless communication device on the wireless communication link, at least one result of scanning the subset of channels.

Another apparatus for wireless communications at a second wireless communication device is described. The apparatus may include means for receiving, from a first wireless communication device in communication with the second wireless communication device on a wireless communication link and within a threshold proximity of the second wireless communication device, control signaling for the second wireless communication device to scan a subset of channels of a set of channels associated with communications between the first wireless communication device and an AP, means for scanning the subset of channels, and means for transmitting, to the first wireless communication device on the wireless communication link, at least one result of scanning the subset of channels.

A non-transitory computer-readable medium storing code for wireless communications at a second wireless communication device is described. The code may include instructions executable by a processor to receive, from a first wireless communication device in communication with the second wireless communication device on a wireless communication link and within a threshold proximity of the second wireless communication device, control signaling for the second wireless communication device to scan a subset of channels of a set of channels associated with communications between the first wireless communication device and an AP, scan the subset of channels, and transmit, to the first wireless communication device on the wireless communication link, at least one result of scanning the subset of channels.

In some examples of the method, apparatuses, and non-transitory computer-readable medium described herein, communication on the wireless communication link with the first wireless communication device may include operations, features, means, or instructions for communicating with the first wireless communication device during periodic service periods in accordance with a service interval, the service interval including periodic service periods and periodic idle periods, and scanning the subset of channels includes scanning the subset of channels during the periodic idle periods.

In some examples of the method, apparatuses, and non-transitory computer-readable medium described herein, scanning the subset of channels may include operations, features, means, or instructions for identifying a respective RSSI associated with each of the subset of channels, the at least one result of scanning the subset of channels including the respective RSSI associated with each of the subset of channels.

In some examples of the method, apparatuses, and non-transitory computer-readable medium described herein, the subset of channels includes at least one of a set of 2 GHz channels, a set of 5 GHz channels, or a set of 6 GHz channels.

In some examples of the method, apparatuses, and non-transitory computer-readable medium described herein, the second wireless communication device may be a wearable device.

Some examples of the method, apparatuses, and non-transitory computer-readable medium described herein may further include operations, features, means, or instructions for receiving, from the first wireless communication device and in response to transmission of the at least one result of scanning the subset of channels, third control signaling for the second wireless communication device to scan a fourth subset of channels of the set of channels and transmitting, to the first wireless communication device on the wireless communication link, at least one result of scanning the fourth subset of channels.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 13 illustrates a flowchart showing a method that supports distributed WLAN scan for low latency applications using a first wireless communication device.

FIG. 14 illustrates a flowchart showing a method that supports distributed WLAN scan for low latency applications using a second wireless communication device.

Like reference numbers and designations in the various drawings indicate like elements.

DETAILED DESCRIPTION

Figure 1:
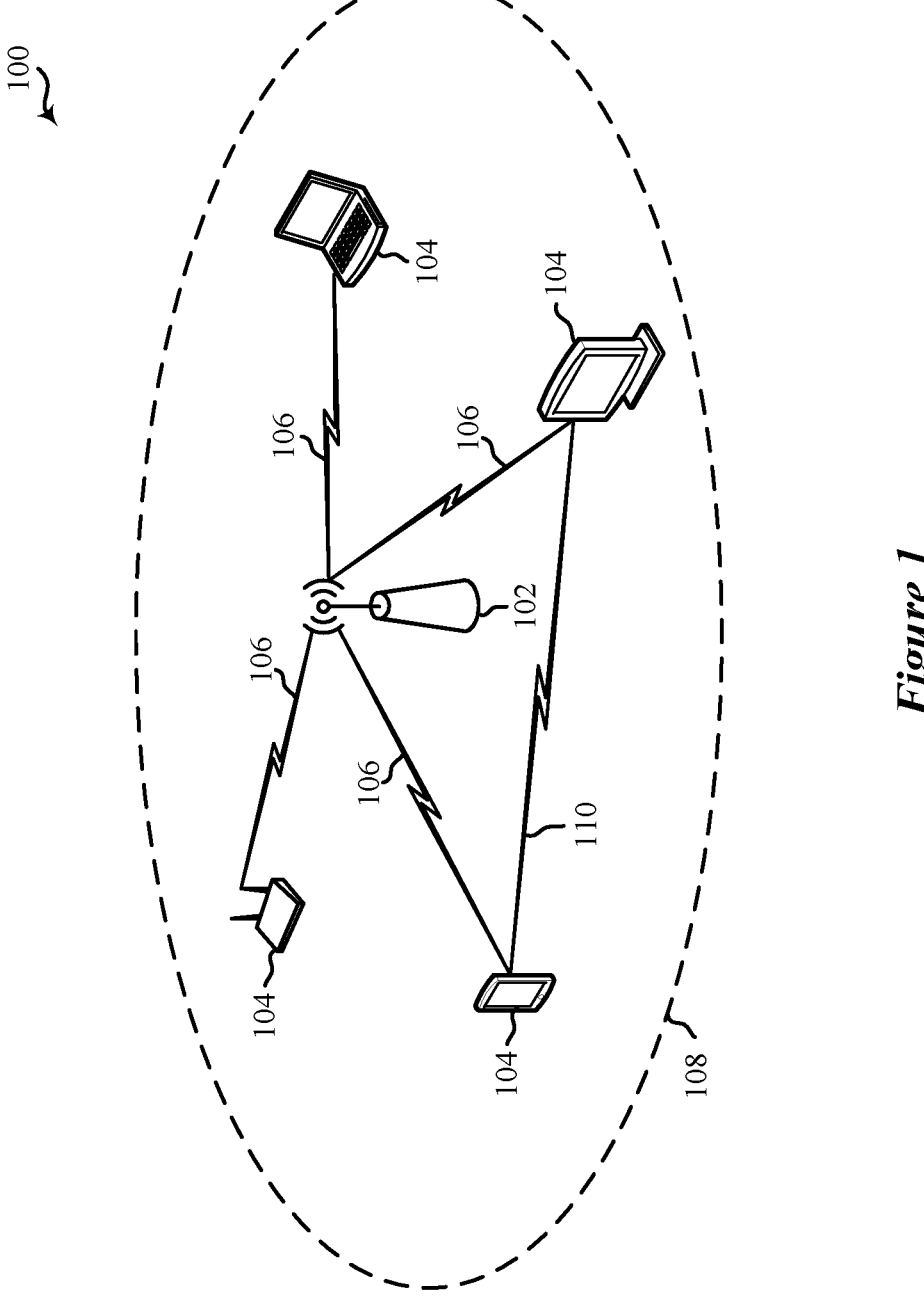
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3^rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

A wireless communication device, such as a station (STA) in a wireless local area network (WLAN), may communicate with an access point (AP) via a channel, such as a 2 gigahertz (GHz), 5 GHz, or 6 GHz wireless communication link. The wireless communication device may also communicate with wearable type wireless communication devices, referred to as wearable type devices hereinafter, in an extended personal audio network (XPAN) via wireless communication links, such as 5 GHz or 6 GHz wireless communication links. Example wearable type devices may include earbuds, smart glasses, cameras, or smart watches. The communication links of the XPAN may be 5 GHz or 6 GHz wireless communication links for reduced latency and/or high throughput applications, such as streaming audio for gaming applications.

The wireless communication device may identify that the wireless communication device should connect with a different AP. For example, the wireless communication device may roam and change physical locations. The wireless communication device may identify a new AP to connect to by scanning a set of channels to identify a channel on which the wireless communication device should connect with the different AP, such as based on received signal strength indicator (RRSI) measurements. In communications between the wireless communication device and the wearable type devices that demand low latency, the time for the wireless communication device to scan the set of channels may impact the low latency communications and insufficient time may be available to scan the set of channels.

Various aspects of this disclosure relate generally to the wireless communication device that operates in a WLAN splitting the set of channels to scan into subsets of channels. The wireless communication device may transmit an indication of a subset of channels to the wearable type device for scanning by the wearable type device. The wearable type device may scan the subset of channels, and the wireless communication device may scan another subset of channels. Accordingly, the set of channels may be scanned in less time by dividing the scanning responsibilities between the wireless communication device and the wearable type device. In some examples, the wireless communication device may transmit subsets of channels to multiple wearable type devices that are within the proximity of the wireless communication device for scanning by the multiple wearable type devices.

The wearable type device may report measurement results, such as RSSI, of the scanned subset of channels at the wearable type device to the wireless communication device. As the wearable type device may be within a threshold proximity of the wireless communication device, the RSSI measured at the wearable type device may be sufficiently similar to what the measurement results, such as RSSI, would be at the wireless communication device. The wireless communication device may identify a channel and AP to connect to in accordance with the measurements reported by the wearable type device for the subset(s) of channels and the measurement results from the scan of the subset(s) of channels performed by the wireless communication device. In some examples, when a signal strength of the communication link between the wireless communication device and the AP is below a threshold level, the wireless communication device may transmit an indication of a subset of channels to the wearable type device for scanning by the wearable type device.

Particular aspects of the subject matter described in this disclosure can be implemented to realize one or more of the following potential advantages. In some examples, the wireless communication device, which may divide the scanning responsibilities between the wireless communication device and the wearable type device, may perform additional functions while the wearable type device is scanning the subset of channels, which may improve the efficiency of the wireless communication device. In some examples, by dividing the scanning responsibilities between the wireless communication device and the wearable type device, the wireless communication device may perform the scanning more efficiently and in less time, thereby reducing latency. In some examples, the wearable type device may perform the scanning during idle periods, thereby performing the scanning more efficiently. In some examples, dividing the scanning responsibilities between the wireless communication device and the wearable type device, may allow the wireless communication device to connect to a new AP sooner to enable seamless roaming and in less time than would be possible under traditional scanning techniques.

Aspects of the disclosure are initially described in the context of a wireless communications system. Aspects of the disclosure are further illustrated by and described with reference to a wireless communications system, timing diagrams, a channel list diagram and process flows. Aspects of the disclosure are further illustrated by and described with reference to apparatus diagrams, system diagrams, and flowcharts that relate to distributed WLAN scan for low latency applications.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless AP 102 and multiple wireless STAs 104. While only one AP 102 is shown in FIG. 1, the WLAN 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct wireless communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHZ and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

A first wireless communication device, such as a STA 104, that operates in a WLAN 100, may communicate with an AP 102 over a communication link 106 via a channel. The first wireless communication device, such as the STA 104, may also communicate with a second wireless communication device, such as a wearable type device (which may be another STA 104), in an XPAN via a wireless communication link. Example wearable type devices may include earbuds, smart glasses, cameras, or smart watches. The first wireless communication device, such as the STA 104, may select to scan a set of channels, for example, to connect with a different AP 102. The first wireless communication device may split the set of channels to scan into subsets of channels. The first wireless communication device may indicate a subset of channels to the second wireless communication device, such as the wearable type device, for scanning by the second wireless communication device. The second wireless communication device may scan the subset of channels, and in some examples the first wireless communication device may scan another subset of channels. Accordingly, the set of channels may be scanned in less time by dividing the scanning responsibilities. The second wireless communication device may report measurement results, such as RSSI, of the scanned subset of channels to the first wireless communication device. As the second wireless communication device may be within a threshold proximity of the first wireless communication device, the RSSI measured at the second wireless communication device may be sufficiently similar to what the measurement results, such as RSSI, would be at the first wireless communication device (for example, based on channel coherency of a first channel between the first wireless communication device and an AP 102 and a second channel between the second wireless communication device and the AP 102). The first wireless communication device may identify a channel and AP 102 to connect to in accordance with the measurements reported by the second wireless communication device for the subsets of channels and the measurement results from the scan of the subset of channels performed by the first wireless communication device.

Figure 2:
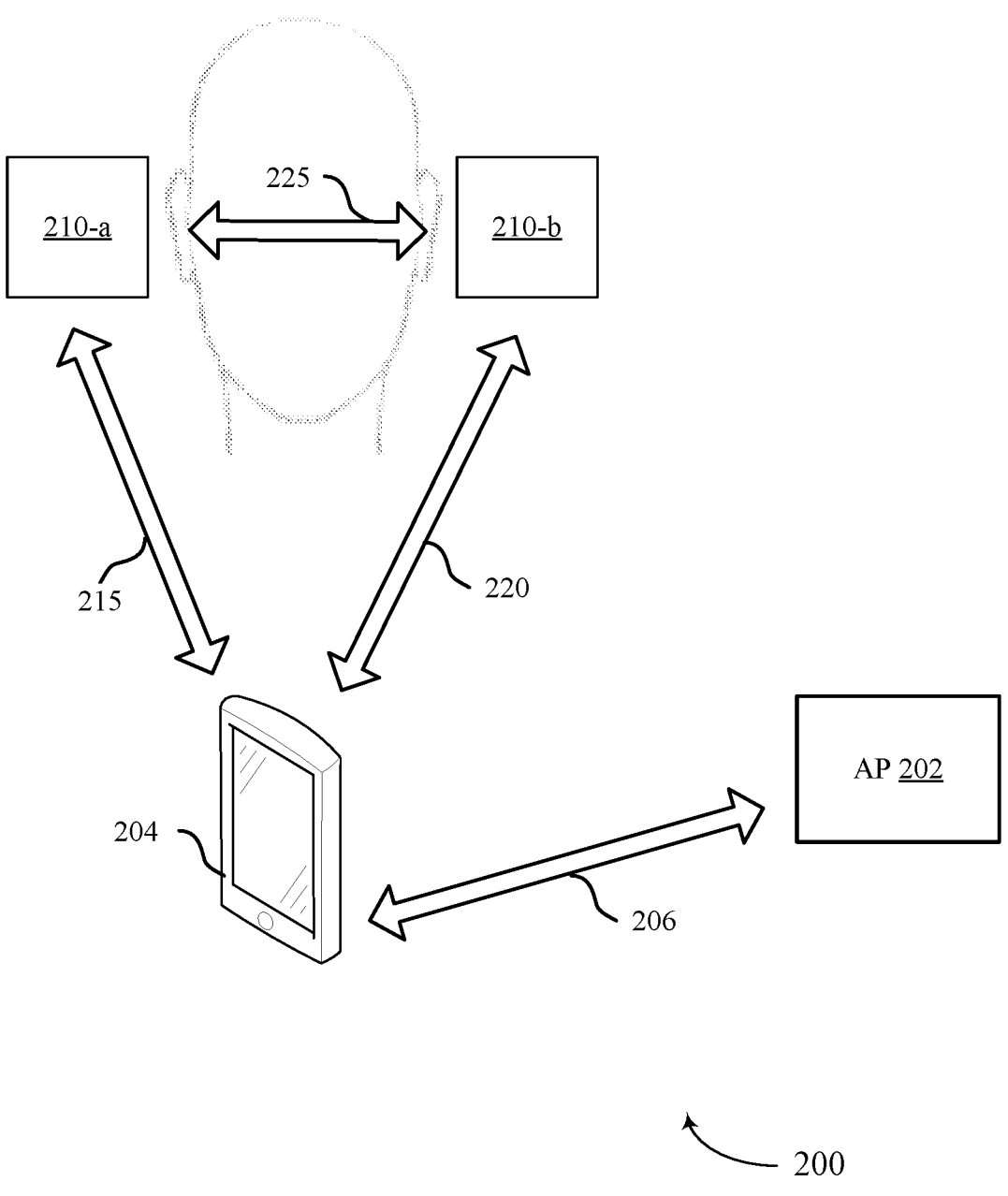
FIG. 2 illustrates an example of a wireless communication system that includes an access point, a first wireless communication device, a second wireless communication device, and a third wireless communication device that supports distributed wireless local area network (WLAN) scan for low latency applications.

FIG. 2 illustrates an example of a wireless communication system 200 that includes an access point, a first wireless communication device, a second wireless communication device and a third wireless communication device that supports distributed WLAN scan for low latency applications. The wireless communication system 200 may include an AP 202, which may be an example of an AP 102 of FIG. 1 as described herein, and a first wireless communication device 204, which may be an example of a STA 104 of FIG. 1 as described herein. The wireless communication system 200 may represent communications between the first wireless communication device 204 and the AP 202 on a communication link 206, which may be an example of a communication link 106 of FIG. 1 as described herein.

The channel of the communication link 206 may be a 2 GHZ, 5 GHZ, or 6 GHz link. The first wireless communication device 204 may communicate with a second wireless communication device 210-*a* and a third wireless communication device 210-*b* in an XPAN. The first wireless communication device 204 may communicate with the second wireless communication device 210-*a* on a wireless communication link 215, and the first wireless communication device 204 may communicate with the third wireless communication device 210-*b* on a wireless communication link 220. In some examples, the communication link 215 and the wireless communication link 220 may be 5 GHz or 6 GHz links for reduced latency and/or high throughput applications, such as streaming audio for gaming applications. In some examples, the communication link 215 and the communication link 220 may be Bluetooth links. In some examples, the second wireless communication device 210-*a* may communicate with the third wireless communication device 210-*b* on a wireless link 225, such as a Bluetooth link.

In some examples, the first wireless communication device 204 may be mobile handset. The second wireless communication device 210-*a* and the third wireless communication device 210-*b* may be wearable type wireless communication devices. In some examples, more than two wearable type wireless communication devices may communicate with the first wireless communication device 204. Example wearable type wireless communication devices include earbuds, smart glasses, cameras, or smart watches. The second wireless communication device 210-*a* and the third wireless communication device 210-*b* may be in physical proximity to the first wireless communication device 204.

In some examples, the first wireless communication device 204 may identify, in accordance with a triggering condition, that the first wireless communication device 204 should scan a set of channels (such as to connect with a different AP 202). For example, the triggering condition may be that the first wireless communication device 204 has changed physical locations, or the triggering condition may be a traffic condition existing at the AP 202. In some examples, the first wireless communication device may receive, from the AP 202, a request to scan the set of channels, and the triggering condition may be the request. The first wireless communication device 204 may identify a new AP 202 to connect to by scanning the set of channels. In some examples, communications between the first wireless communication device 204 and the second wireless communication device 210-*a* and communications between the first wireless communication device 204 and the third wireless communication device 210-*b* may demand low latency. However, the time taken to scan the set of channels by the first wireless communication device may impact the low latency communications or insufficient time may be available to scan the set of channels. In some examples, the first wireless communication device 204 may share the scanning of the set of channels with the second wireless communication device 210-*a* and the third wireless communication device 210-*b*. For example, the first wireless communication device 204 may scan a subset of channels, the second wireless communication device 210-*a* may scan another subset of channels and the third wireless communication device 210-*b* may scan yet another subset of channels.

Figure 3:
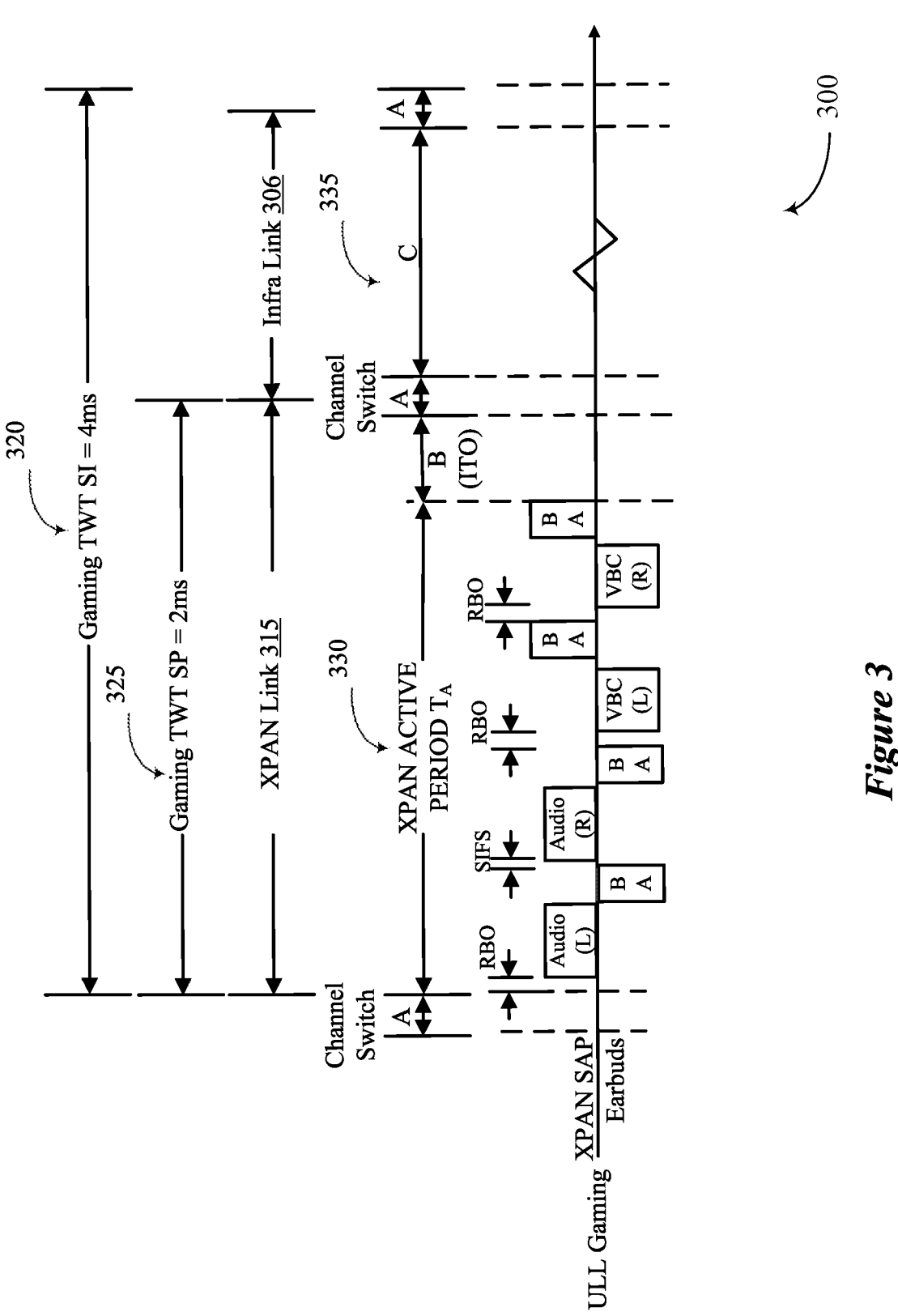
FIG. 3 illustrates an example of a timing diagram that illustrates communications between an AP, a first wireless communication device, a second wireless communication device, and a third wireless communication device that supports distributed WLAN scan for low latency applications.

FIG. 3 illustrates an example of a timing diagram 300 that illustrates communications between an AP, a first wireless communication device, a second wireless communication device, and a third wireless communication device that supports distributed WLAN scan for low latency applications. Aspects of the timing diagram 300 may implement, or be implemented by, aspects of the WLAN 100 and the wireless communication system 200. For example, the timing diagram 300 illustrates a timing for communications between the first wireless communication device 204 and the AP 202 and for communications between the first wireless communication device 204 and the second wireless communication device 210-*a* and the third wireless communication device 210-*b* of the wireless communication system 200.

FIG. 3 illustrates a timing diagram 300 for a time division multiplexing (TDM) between communication link 206 and communication link 215 and communication link 220. In some examples, such as the illustrated example of FIG. 3, the first wireless communication device 204 may be a mobile handset implementing an ultra-low latency (ULL) gaming application. The second wireless communication device 210-*a* and the third wireless communication device 210-*b* may be wearable type devices. For the illustrated example of FIG. 3, the second wireless communication device 210-*a* may be a left earbud device and the third wireless communication device may be a right earbud device.

In some examples, during the ULL gaming application, the first wireless communication device 204 may communicate with the AP 202 via the communication link 206. The communication link 206 may carry the infra traffic or WLAN STA traffic for the gaming application. For the illustration of FIG. 2, the communication link 206 may be referred to as an infra link 306. The communication link 215 and the communication link 220 may carry the XPAN traffic. For the illustration of FIG. 3, the communication link 215 and the communication link 220 may be referred to as an XPAN link 315. The XPAN link may carry audio for the left earbud and the right ear bud.

The TDM may be implemented using a Target Wake Time (TWT) with service interval (SI) as 4 milliseconds (ms) or 8 ms and a service period (SP) as 2 ms or 4 ms respectively. For the example of FIG. 3, the TWT SI 320 may be 4 ms, and TWT SP 325 may be 2 ms. Thus, XPAN link 315 may be active on a first 2 ms and the Infra link 306 may be active on a second 2 ms duration. In some examples, the TWT SI 320 may include periodic service periods, referred to as XPAN active period 330, and periodic idle periods, referred to as XPAN inactive period 335, for the left and right earbuds (second wireless communication device 210-*a* and third wireless communication device 210-*b*). During the XPAN active period 330, the first wireless communication device 204 may transmit left audio to the left earbud and right audio to the right earbuds, respectively, and the left and right earbuds may transmit block acknowledgment(s) (BAs) via the XPAN link 315. The left and right earbuds may transmit voice back channel (VBC) messages to the first wireless communication device 204, and the first wireless communication device 204 may transmit BAs via the XPAN link 315. After the block acknowledgments, the first wireless communication device 204, and the left and right earbuds may perform a random back off (RBO) procedures. During the XPAN inactive period 335, the XPAN link 315 may be idle. An inactivity time (ITO) may monitor inactivity, and the handset may switch from XPAN (such as, the XPAN link 315) to the infra link 306 when the ITO exceeds a threshold.

In some examples, the first wireless communication device 204 may receive a periodic or aperiodic request from the AP 202 to perform a scan on a set of channels during the 2 ms service period (XPAN inactive period 335). However, the first wireless communication device 204 may not have sufficient time to complete the scan of channels during the 2 ms time interval because the first wireless communication device 204 may communicate gaming traffic on the XPAN link 315. Additionally, if a scan dwell time on a channel is increased sufficiently, the overall scan time may be impacted. Thus, the first wireless communication device 204 scanning a set of channels, such as 2 GHZ, 5 GHz and 6 GHz channels, with the limited time available may impact the scan performance and may impact roaming as roam scan may be required during the gaming application.

In some examples, the first wireless communication device 204 may be a mobile handset implementing another application different from the gaming application. In this example, the second wireless communication device 210-*a* may be a left earbud device and the third wireless communication device 210-*b* may be a right earbud device. During the application, the first wireless communication device 204 may communicate with the AP 202 via the Infra link 306, and the Infra link 306 may carry the infra traffic or WLAN STA traffic for the application. The XPAN link 315 may carry the XPAN traffic for the application, such as audio for the left earbud and the right ear bud. Similarly as the example of FIG. 3, the XPAN link 315 may have the XPAN active period 330 and the XPAN inactive period 335.

Figure 4:
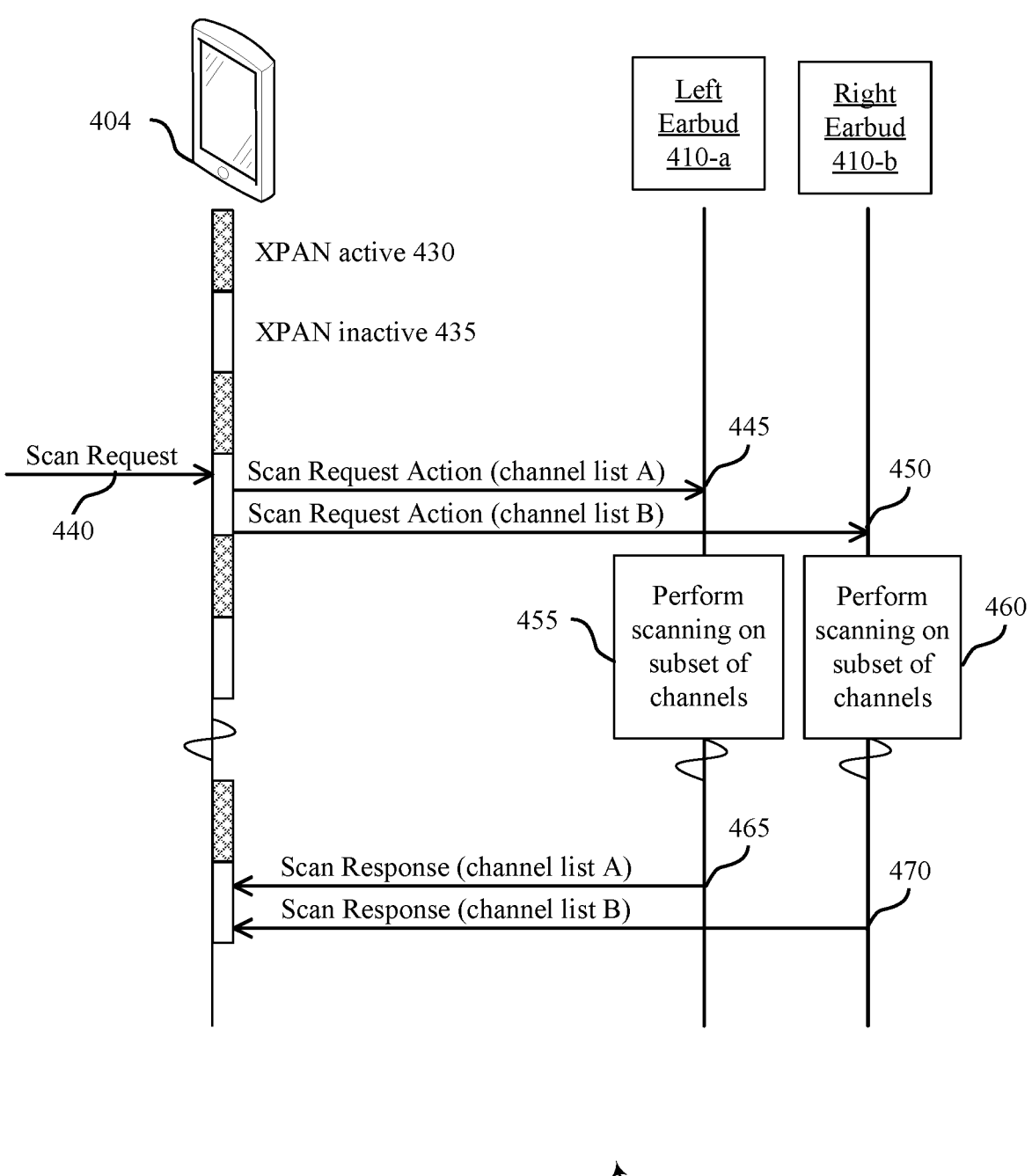
FIG. 4 illustrates an example of a process flow that supports communications between a first wireless communication device, a second wireless communication device, and a third wireless communication device that supports distributed WLAN scan for low latency applications.

FIG. 4 illustrates an example of a process flow 400 that supports communications between a first wireless communication device, a second wireless communication device, and a third wireless communication device that supports distributed WLAN scan for low latency applications. The process flow may include a first wireless communication device 404, which may be an example of the first wireless communication device 204, a left earbud 410-*a*, which may be an example of the second wireless communication device 210-*a* and a right earbud 410-*b*, which may be an example of the third wireless communication device 210-*b*.

In some examples, to address the possible insufficient time to perform the scanning of channels, the first wireless communication device 404 may split a set of channels for scanning into subsets of channels. The first wireless communication device 404, second wireless communication device (left earbud 410-*a*) and third wireless communication device (right earbud 410-*b*) may perform scans on different subsets of channels. Accordingly, the set of channels may be scanned in less time by dividing the scanning responsibilities between the devices. In some examples, the set of channels may be divided into subsets of channels in accordance with a channel group associated with the channels. For example, a subset of channels may contain 2 GHz band channels, another subset of channels may contain 5 GHz band channels, and yet another subset of channels may contain 6 GHz band channels. In some examples, a subset may comprise 2 GHz band channels, another subset may contain 5 GHz band active or passive channels, and yet another subset may contain 6 GHz band preferred scanning channels (PSC) or non-PSC channels. In some examples, the set of channels may be associated with the communication link 206 with the AP 202.

In some examples, the device under test (DUT) or the first wireless communication device 404 may prepare a vendor specific action frame, such as a scan offload request that may contain the subset of channels to be scanned by the second wireless communication device (left earbud 410-*a*) or the third wireless communication device (right earbud 410-*b*). For example, second wireless communication device (left earbud 410-*a*) may receive a subset of channels and the third wireless communication device (right earbud 410-*b*) may receive another subset of channels. In some examples, the scan capabilities of the second wireless communication device (left earbud 410-*a*) and the third wireless communication device (right earbud 410-*b*) may be negotiated with the first wireless communication device 404 using an association request frame and an association response frame via vendor information elements.

In some examples, the first wireless communication device 404 may be dual band simultaneous (DBS) device, and accordingly the first wireless communication device 404 may perform a scan on one of the subsets of channels in parallel with the TWT operations. In some examples, the first wireless communication device 404 may be a non-DBS device that may be unable to perform the scan in parallel with the TWT operations, and in this example, all of the channels of the set of channels may be offloaded for scanning to the second wireless communication device (such as left earbud 410-*a*) and the third wireless communication device (right earbud 410-*b*). The second wireless communication device (left earbud 410-*a*) and the third wireless communication device (right earbud 410-*b*) may perform the scan of the subset of channels when not in the TWT SP period. That is, the second wireless communication device (left earbud 410-*a*) and the third wireless communication device (right earbud 410-*b*) may perform the scan of the subset of channels during the XPAN inactive period 335 when the XPAN link 315 may be idle as shown in FIG. 3. The result of scanning the subset of channels may include a respective RSSI value associated with each of the subset of channels.

In some examples, the second wireless communication device (left earbud 410-*a*) and the third wireless communication device (right earbud 410-*b*) may be in proximity to the first wireless communication device 404 to provide accurate scan results. Wearable devices, such as the left earbud 410-*a* and the right earbud 410-*b*, may be typically located in close proximity of the mobile handset, such as the first wireless communication device 404. Accordingly, the RSSI measured at the second wireless communication device (left earbud 410-*a*) and the third wireless communication device (right earbud 410-*b*) may be sufficiently similar to what the RSSI would be at the first wireless communication device 404. In some examples, the first wireless communication device 404 may identify whether the second wireless communication device (left earbud 410-*a*) and the third wireless communication device (right earbud 410-*b*) are located in proximity. For example, the first wireless communication device 404 may receive an indication that a measured RRSI value associated with a transmission from the second wireless communication device (left earbud 410-*a*) and/or the third wireless communication device (right earbud 410-*b*) satisfies a threshold level.

FIG. 4 illustrates an example process flow for the first wireless communication device 404 splitting the set of channels for scanning into subsets of channels. In some examples, the TWT SI may include periodic service periods and periodic idle periods. The illustration of FIG. 4 shows at 430 the periodic service period or the XPAN active period when the XPAN link 315 may be active. The illustration of FIG. 4 shows at 435 the periodic idle period or XPAN inactive when the XPAN link 315 may be inactive. At 440, the first wireless communication device 404 may receive a scan request from an AP, such as an AP 202 as shown in FIG. 2, via the infra link, such as the communication link 206 as shown in FIG. 2. In some examples, the scan request may include a request to scan a set of channels, such as the request may indicate a set of channels to scan. In another example, the trigger condition for scanning the set of channels may be the signal strength associated with the infra link, such as the communication link 206 as shown in FIG. 2, is below a threshold level.

At 445, the first wireless communication device 404 may transmit a scan request action indicating a first subset of channels (channel list A) to the left earbud 410-*a*. At 450, the first wireless communication device 404 may transmit a scan request action indicating a second subset of channels (channel list B) to the right earbud 410-*b*. In some examples, the scan request action transmissions occur during the periodic idle period or XPAN inactive. At 455, the left earbud 410-*a* may perform scanning on the requested subset of channels (channel list A). At 460, the right earbud 410-*b* may perform scanning on the requested subset of channels (channel list B). At 465, the left earbud 410-*a* may transmit a scan response or scan result corresponding to the first subset of channels (channel list A) to the first wireless communication device 404. At 470, the left earbud 410-*a* may transmit a scan response or scan result corresponding to the second subset of channels (channel list B) to the first wireless communication device 404. Using the results of the scanning of the subsets of channels, the first wireless communication device 404 may identify the channel to initiate a connection procedure, such as for an infra link with an AP 202 as shown in FIG. 2.

Figure 5:
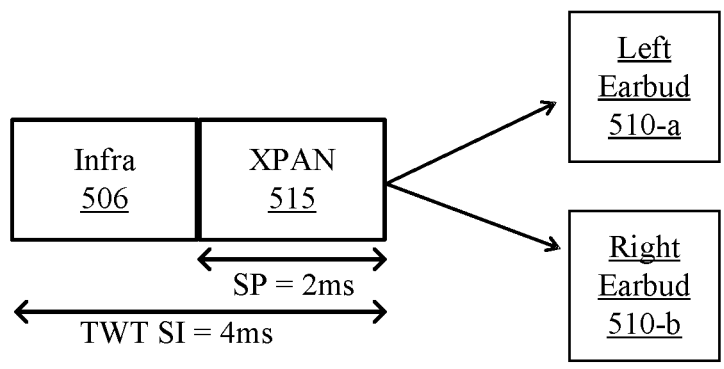
FIG. 5 illustrates an example of a timing diagram that illustrates communications between a first wireless communication device, a second wireless communication device and a third wireless communication device that supports distributed WLAN scan for low latency applications.
Figure 5:
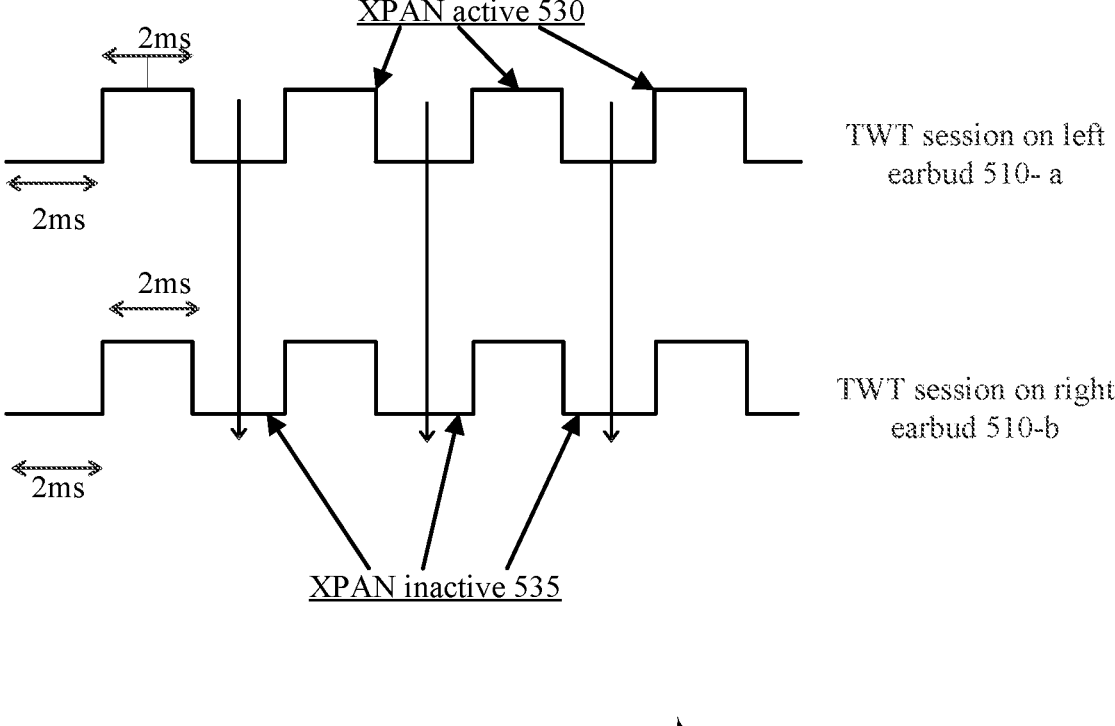

FIG. 5 illustrates an example of a timing diagram 500 that illustrates communications between a first wireless communication device, a second wireless communication device and a third wireless communication device that supports distributed WLAN scan for low latency applications. Aspects of the timing diagram 500 may implement, or be implemented by, aspects of the WLAN 100 and the wireless communication system 200. For example, the timing diagram 500 illustrates a TWT for communications with a left earbud 510-*a*, which may be an example of the second wireless communication device 210-*a* and a right earbud 510-*b*, which may be an example of the third wireless communication device 210-*b* of the wireless communication system 200.

In some examples, the wireless communication system 200 may have a TWT with service interval of 4 milliseconds (ms) and a service period of 2 ms. The XPAN link may be active for 2 ms. The XPAN link may be inactive for 2 ms when the infra link 506 may be active. In some examples, the TWT SI may include periodic service periods, referred to as XPAN active period 530, and periodic idle periods, referred to as XPAN inactive period 535, for the left earbud 510-*a* and the right earbud 510-*b*. During the XPAN active period 530, the left earbud 510-*a* and the right earbud 510-*b* may receive audio data, and the left earbud 510-*a* and right earbud 510-*b* may transmit acknowledgments, such as BAs via the XPAN link 515. During the XPAN inactive period 535, the XPAN link 515 may be idle and the infra link 506 may be active. In some examples, the left earbud 510-*a* and the right earbud 510-*b* may scan the subset of channels. For example, during the XPAN inactive period 535, the left earbud 510-*a* may scan channel list A, and the right earbud 510-*b* may scan channel list B, as described herein with reference to FIG. 4.

Figure 6:
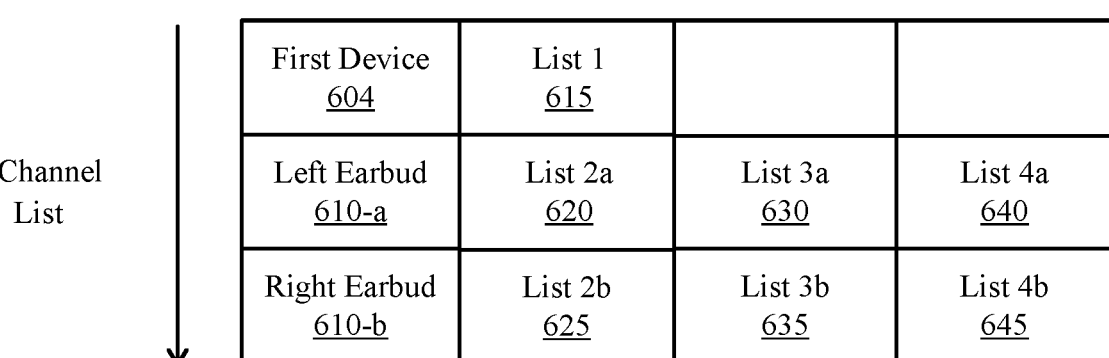
FIG. 6 illustrates an example of a channel list diagram that supports distributed WLAN scan for low latency applications.

FIG. 6 illustrates an example of a channel list diagram 600 that supports distributed WLAN scan for low latency applications. The channel list diagram 600 may implement, or be implemented by, aspects of the WLAN 100 and the wireless communication system 200. For example, the channel list diagram 600 illustrates subsets of channels that may be scanned by a first wireless communication device 604, the second wireless communication device (left earbud 610-*a*) and the third wireless communication device (right earbud 610-*b*) of the wireless communication system 200, which may be example of the first wireless communication device 204, second wireless communication device 210-*a* and third wireless communication device 210-*b* of the wireless communication system 200.

In some examples, the first wireless communication device 604 may have a set of channels (channel list) for scanning. The first wireless communication device 604 may identify how to split the set of channels into subsets after detecting available wearable type devices in vicinity of the first wireless communication device 604. FIG. 6 illustrates an example channel list diagram 600 for the left earbud 610-*a* and the right earbud 610-*b* being detected within the vicinity of the first wireless communication device 604.

For the illustrated examples, the set of channels may be divided into seven subsets of channels. In other examples, the quantity of subsets may be at least the quantity of wearable type devices in proximity of the first wireless communication device 604. Each subset of channels may include similar quantities of channels to scan or different quantities of channels to scan. As shown in FIG. 6, the set of channels is divided into seven subsets: list 1 615, list 2a 620, list 2b 625, list 3a 630, list 3b 635, list 4a 640, and list 4b 645.

In some examples, the first wireless communication device 604 may transmit list 2a 620 to the left earbud 610-*a* and list 2b 625 to the right earbud 610-*b* via the XPAN link. In another example, the first wireless communication device 604 may transmit the scan list to the second wireless communication device via another communication link that may be of a different technology than the infra link between the first wireless communication device and the AP, such as a Bluetooth link. After the left earbud 610-*a* transmits the scan result for list 2a 620 to the first wireless communication device 604, the first wireless communication device 604 may transmit list 3a 630 to the left earbud 610-*a*. Similarly, after the right earbud 610-*b* transmits the scan result for list 2b 625 to the first wireless communication device 604, the first wireless communication device 604 may transmit list 3b 635 to the right earbud 610-*b*. This process continues until all of the subsets of channels have been scan.

In some examples, after the first wireless communication device 604 receives the scan result of one of the subsets of channels, the first wireless communication device 604 may recalculate the subsets of channel or create new channel list less the channels for which results have been received. In some examples, the left earbud 610-*a* may transmit scan results sooner than the right earbud 610-*b*, and the first wireless communication device 604 may transmit a subset of channels to the left earbud 610-*a* but not to the right earbud 610-*b*. In some examples, the left earbud 610-*a* and right earbud 610-*b* may coordinate with each other to scan the subsets of channels. For example, the left earbud 610-*a* may transmit a subset of channels to the right earbud 610-*b* via a communication link between the left earbud 610-*a* and the right earbud 610-*b*, such as a Bluetooth link, and the right earbud 610-*b* may scan the subset of channels. Additionally, the left earbud 610-*a* may transmit scan results to the right earbud 610-*b* that may be forwarded by the right earbud 610-*b* to the first wireless communication device 604.

Figure 7:
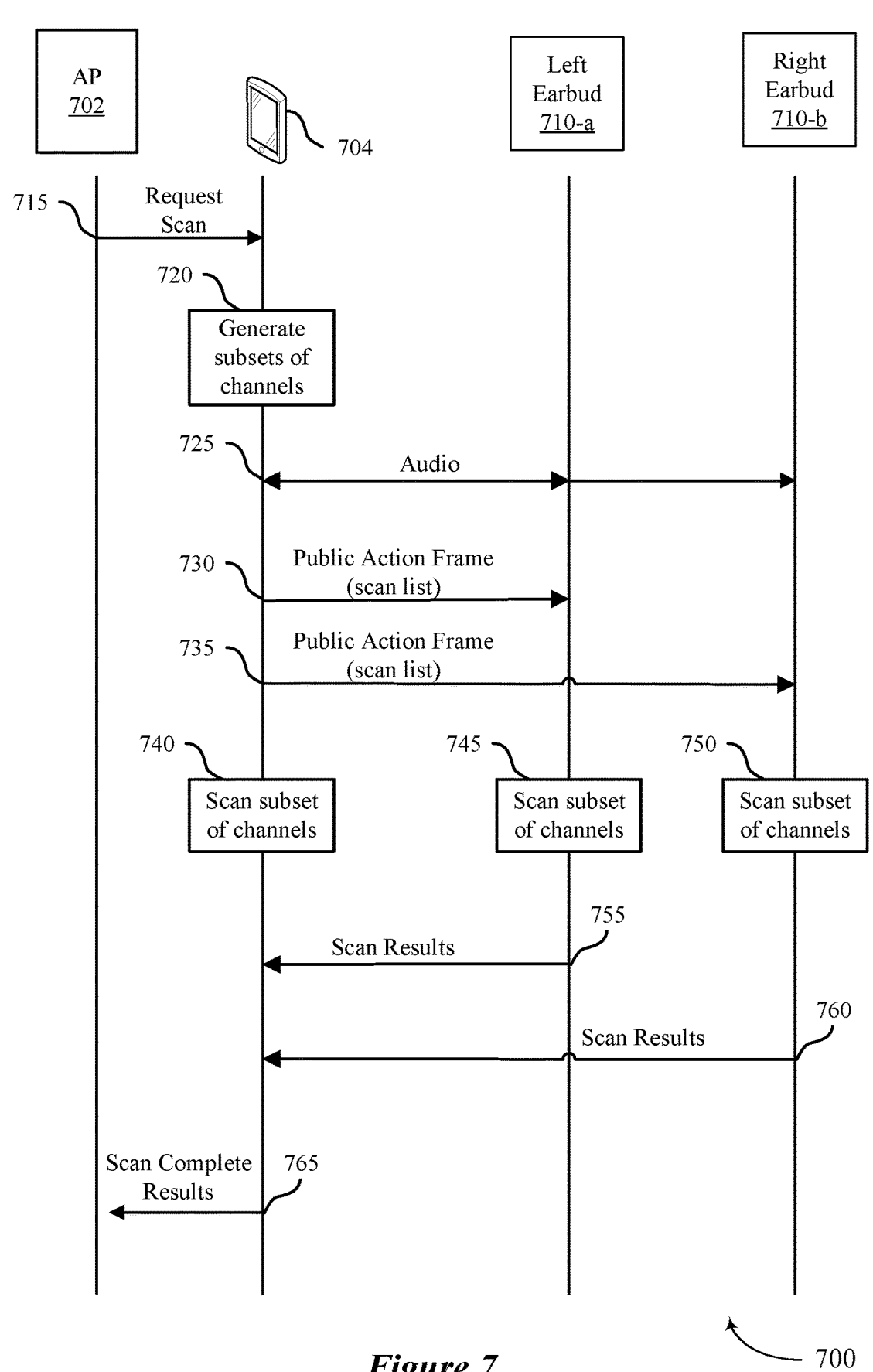
FIG. 7 illustrates an example of a process flow that supports communications between an access point, a first wireless communication device, a second wireless communication device, and a third wireless communication device that supports distributed WLAN scan for low latency applications.

FIG. 7 illustrates an example of a process flow 700 that supports communications between an access point, a first wireless communication device, a second wireless communication device, and a third wireless communication device that supports distributed WLAN scan for low latency applications. The process flow includes the first wireless communication device 704 and the AP 702, which may be examples of a first wireless communication device 204 and AP 102 as described herein. The process flow includes a left earbud 710-*a* and a right earbud 710-*b*, which may be example of a left earbud 510-*a* or 610-*a* and a right earbud 510-*b* or 610-*b* as described in connection with FIGS. 5 and 6 above. In the following description of the process flow 700, the operations between the AP 702, the first wireless communication device 704, the left earbud 710-*a* and the right earbud 710-*b* may be transmitted in a different order than the example order shown, or the operations performed may be performed in different orders or at different times. Some operations may also be omitted from the process flow 700, and other operations may be added to the process flow 700.

At 715, the first wireless communication device 704 may receive, from the AP 702, a request to scan a set of channels. At 720, the first wireless communication device 704 may generate subsets of channels by dividing set of channels into groups as describe above in FIG. 6. At 725, the first wireless communication device 704 may communicate with the left earbud 710-*a* and the right earbud 710-*b* during the XPAN active service period of the TWT SI. For example, the first wireless communication device 704 may transmit audio data to the left earbud 710-*a* and right earbud 710-*b*.

At 730, the first wireless communication device 704 may transmit a public action frame with a subset of channels to the left earbud 710-*a*. At 735, the first wireless communication device 704 may transmit a public action frame with another subset of channels to the left earbud 710-*a*. At 740, the first wireless communication device 704 may scan a subset of channels. At 745, the left earbud 710-*a* may scan a subset of channels. At 750, the right earbud 710-*b* may scan a subset of channels. At 755, the left earbud 710-*a* may transmit a result of the scan of the subset of channels to the first wireless communication device 704. At 760, the right earbud 710-*b* may transmit a result of the scan of the subset of channels to the first wireless communication device 704. The result of the scan of the subset of channels may the respective RSSI associated with each of the subset of channels. At 765, the first wireless communication device 704 may transmit complete scan results for the set of channels to the AP 702. As a result of the complete scan results, the first wireless communication device 704 may connect to a new AP or determine that the signal strength of the communication link with the AP 702 is below a threshold level.

Figure 8:
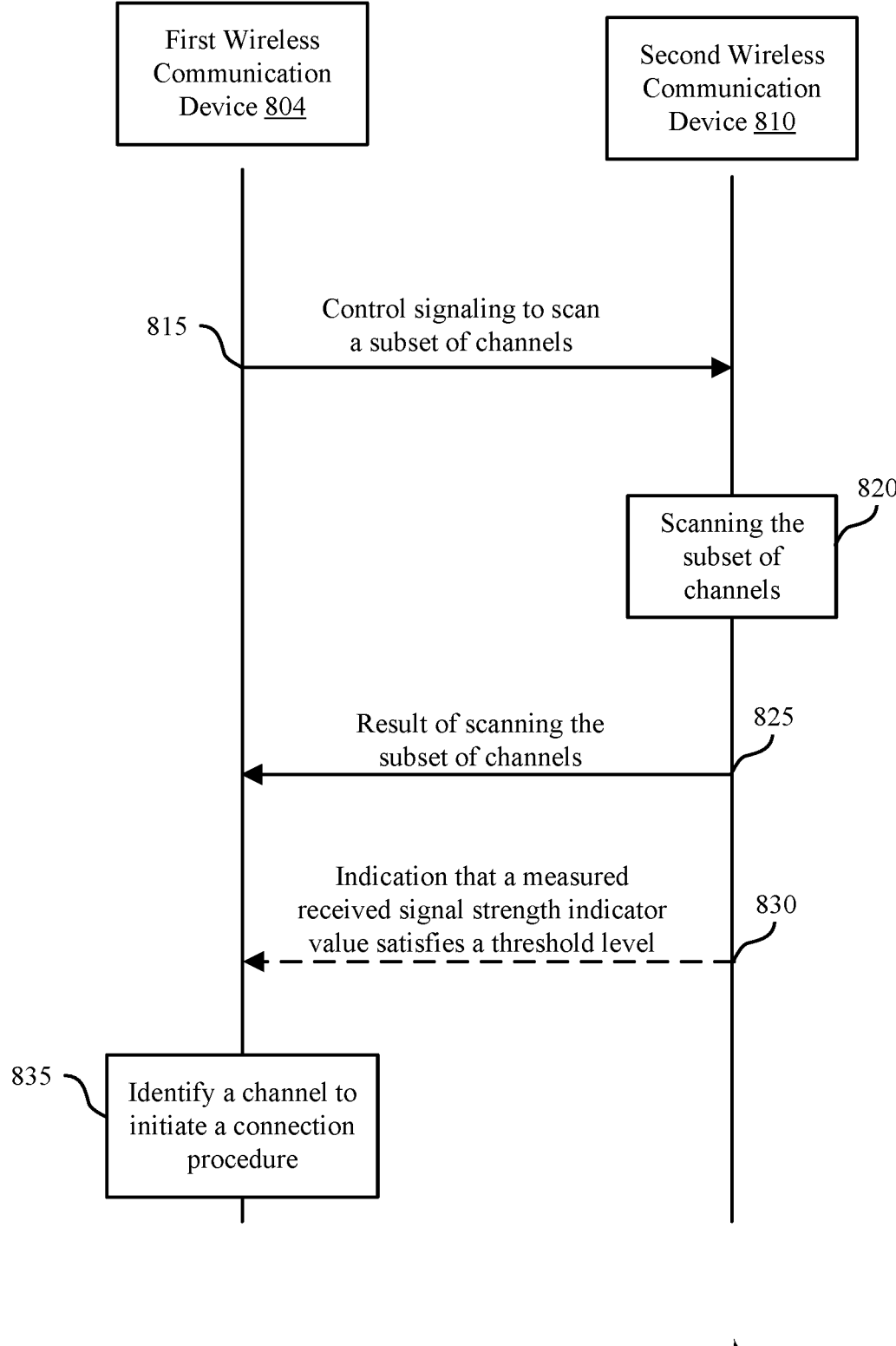
FIG. 8 illustrates an example of a process flow process flow that supports communications between at least two wireless communication devices that supports distributed WLAN scan for low latency applications.

FIG. 8 illustrates an example of a process flow 800 that supports communications between at least two wireless communication devices that supports distributed WLAN scan for low latency applications. The process flow includes a first wireless communication device 804, which may be an example of a first wireless communication device 204 or STA 104 as described herein. The process flow includes a second wireless communication device 810, which may be an example of a second wireless communication device 210-*a* or STA 104 as described herein. For example, the second wireless communication device 810 may be a wearable type device (such as, an earbud 510-*a*, 510-*b*, 610-*a*, 610-*b*, 710-*a* or 710-*b* as described herein). In the following description of the process flow 800, the operations between the first wireless communication device 804 and the second wireless communication device 810 may be transmitted in a different order than the example order shown, or the operations performed by the first wireless communication device 804 and the second wireless communication device 810 may be performed in different orders or at different times. Some operations may also be omitted from the process flow 800, and other operations may be added to the process flow 800.

At 815, the first wireless communication device 804 may transmit, to the second wireless communication device 810, control signaling for the second wireless communication device 810 to scan a subset of channels of a set of channels. The second wireless communication device 810 may be in communication with the first wireless communication device 804 on a wireless communication link. In some examples, the first wireless communication may detect the second wireless communication device 810 is within a threshold proximity of the first wireless communication device 804. The first wireless communication device may transmit the control signal in response to a triggering condition associated with scanning a set of channels by the first wireless communication device 804.

At 820, the second wireless communication device 810 may scan the subset of channels. In some examples, second wireless communication device 810 may identify a respective RSSI associated with each of the subset of channels. At 825, the first wireless communication device 804 may receive, from the second wireless communication device 810 on the wireless communication link, a result of scanning the subset of channels. In some examples, the result of scanning the subset of channels may include the respective RSSI associated with each of the subset of channels.

At 830, the first wireless communication device 804 may receive an indication that a measured RSSI value associated with a transmission from the second wireless communication device 810 satisfies a threshold level. In some examples, the first wireless communication device 804 may detect that the second wireless communication device 810 is with the threshold proximity using the received indication that a measured RSSI value associated with a transmission from the second wireless communication device 810 satisfies the threshold level.

At 835, the first wireless communication device 804 may identifying a channel of the set of channels to initiate a connection procedure (such as, for an infra link with an AP 102). The first wireless communication device 804 may identify the channel with the result of the scanning the subset of channels.

In some examples, the first wireless communication device 804 may receive, from an access point, a request to scan the set of channels. The set of channels may be associated with communications between the first wireless communication device 804 and the access point. In some examples, the first wireless communication device 804 may communicate on a second wireless communication link with the access point. The first wireless communication device 804 may identify that a signal strength associated with the second wireless communication link between the first wireless communication device 804 and the access point is below a threshold level. The triggering condition may include the signal strength associated with the second wireless communication link is below the threshold level. The set of channels may be associated with the second wireless communication link.

In some examples, the first wireless communication device 804 may scan a second subset of channels of the set of channels different from the subset of channels. In some examples, the first wireless communication device 804 may detect a third wireless communication device in communication with the first wireless communication device on a third wireless communication link is within the threshold proximity of the first wireless communication device. The first wireless communication device 804 may transmit, to the third wireless communication device, second control signaling indicating for the third wireless communication device to scan a third subset of channels of the set of channels. The third subset of channels different from the subset of channels and the second subset of channels. The first wireless communication device 804 may receive, from the third wireless communication device on the wireless communication link, a result of scanning the third subset of channels.

In some examples, the set of channels may include at least two of a set of 2 GHz channels, a set of 5 GHz channels, and a set of 6 GHz channels. The subset of channels may include one of the set of 2 GHz channels, the set of 5 GHz channels, or the set of 6 GHz channels. The second subset of channels may include a different one of the set of 2 GHz channels, the set of 5 GHz channels, or the set of 6 GHz channels. The third subset of channels may include a different one of the set of 2 GHz channels, the set of 5 GHz channels, or the set of 6 GHz channels.

In some examples, the first wireless communication device 804 may communicate with the second wireless communication device 810 during periodic service periods in accordance with a service interval. The service interval may include periodic service periods and periodic idle periods. The scanning the second subset of channels may include scanning the second subset of channels during the periodic idle periods.

In some examples, the first wireless communication device 804 may receive an indication of a quantity of wireless communication devices in communication with the first wireless communication device within the threshold proximity of the first wireless communication device. A quantity of channels within the subset of channels may be responsive to the quantity of wireless communication devices. In some examples, the second wireless communication device 810 may be a wearable device.

In some examples, the first wireless communication device 804 may transmit, to the second wireless communication device 810 and in response to the result of scanning the subset of channels, third control signaling for the second wireless communication device 810 to scan a fourth subset of channels of the set of channels. The first wireless communication device 804 may receive, from the second wireless communication device 810, a result of scanning the fourth subset of channels.

Figure 9:
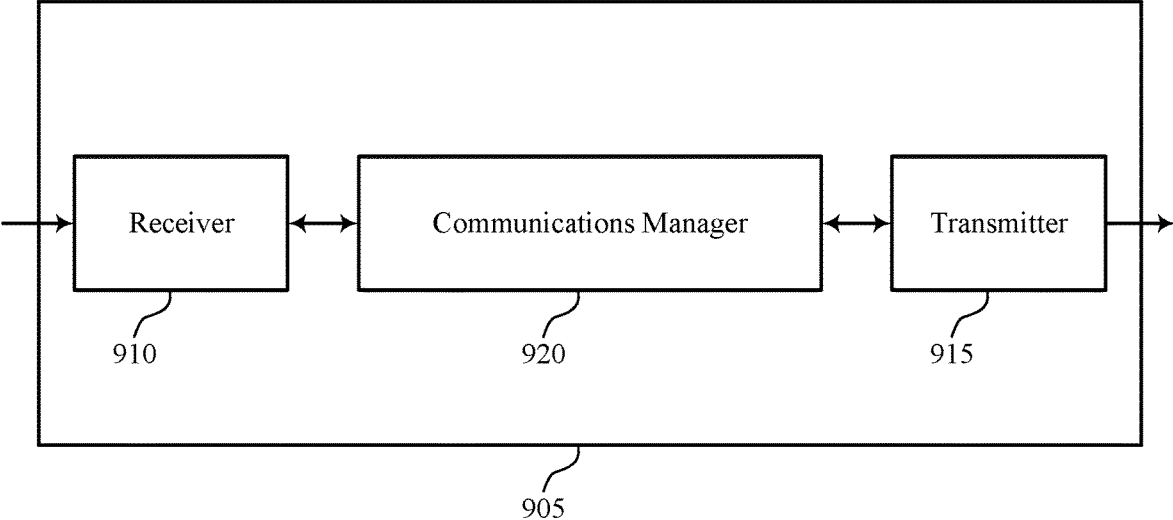
FIGS. 9 and 10 illustrate block diagrams of devices that support methods for distributed WLAN scan for low latency applications and that may be examples of a first wireless communication device or a second wireless communication device.
Figure 9:

FIG. 9 illustrates a block diagram 900 of a device 905 that supports methods for distributed WLAN scan for low latency applications and may be examples of a first wireless communication device or a second wireless communication device. The device 905 may be an example of aspects of an STA as described herein. The device 905 may include a receiver 910, a transmitter 915, and a communications manager 920. The device 905 may also include a processor. Each of these components may be in communication with one another (such as, via one or more buses).

The receiver 910 may provide a means for receiving information such as packets, user data, control information, or any combination thereof associated with various information channels (such as, control channels, data channels, information channels related to distributed WLAN scan for low latency applications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (such as, control channels, data channels, information channels related to distributed WLAN scan for low latency applications). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of distributed WLAN scan for low latency applications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (such as, in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (such as, by executing, by the processor, instructions stored in the memory).

Additionally, or alternatively, in some examples, the communications manager 920, the receiver 910, the transmitter 915, or various combinations or components thereof may be implemented in code (such as, as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (such as, configured as or otherwise supporting a means for performing the functions described in the present disclosure).

In some examples, the communications manager 920 may be configured to perform various operations (such as, receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a first wireless communication device in accordance with examples as disclosed herein. For example, the communications manager 920 may be configured as or otherwise support a means for responsive to detecting a second wireless communication device in communication with the first wireless communication device on a wireless communication link is within a threshold proximity of the first wireless communication device, transmitting, to the second wireless communication device, control signaling for the second wireless communication device to scan a subset of channels of a set of channels. The communications manager 920 may be configured as or otherwise support a means for receiving, from the second wireless communication device on the wireless communication link, at least one result of scanning the subset of channels.

Additionally, or alternatively, the communications manager 920 may support wireless communications at a second wireless communication device in accordance with examples as disclosed herein. For example, the communications manager 920 may be configured as or otherwise support a means for receiving, from a first wireless communication device in communication with the second wireless communication device on a wireless communication link and within a threshold proximity of the second wireless communication device, control signaling for the second wireless communication device to scan a subset of channels of a set of channels associated with communications between the first wireless communication device and an access point. The communications manager 920 may be configured as or otherwise support a means for scanning the subset of channels. The communications manager 920 may be configured as or otherwise support a means for transmitting, to the first wireless communication device on the wireless communication link, at least one result of scanning the subset of channels.

By including or configuring the communications manager 920 in accordance with examples as described herein, the device 905 (such as, a processor controlling or otherwise coupled with the receiver 910, the transmitter 915, the communications manager 920, or a combination thereof) may support techniques for reduced processing, reduced power consumption, more efficient utilization of communication resources.

Figure 10:
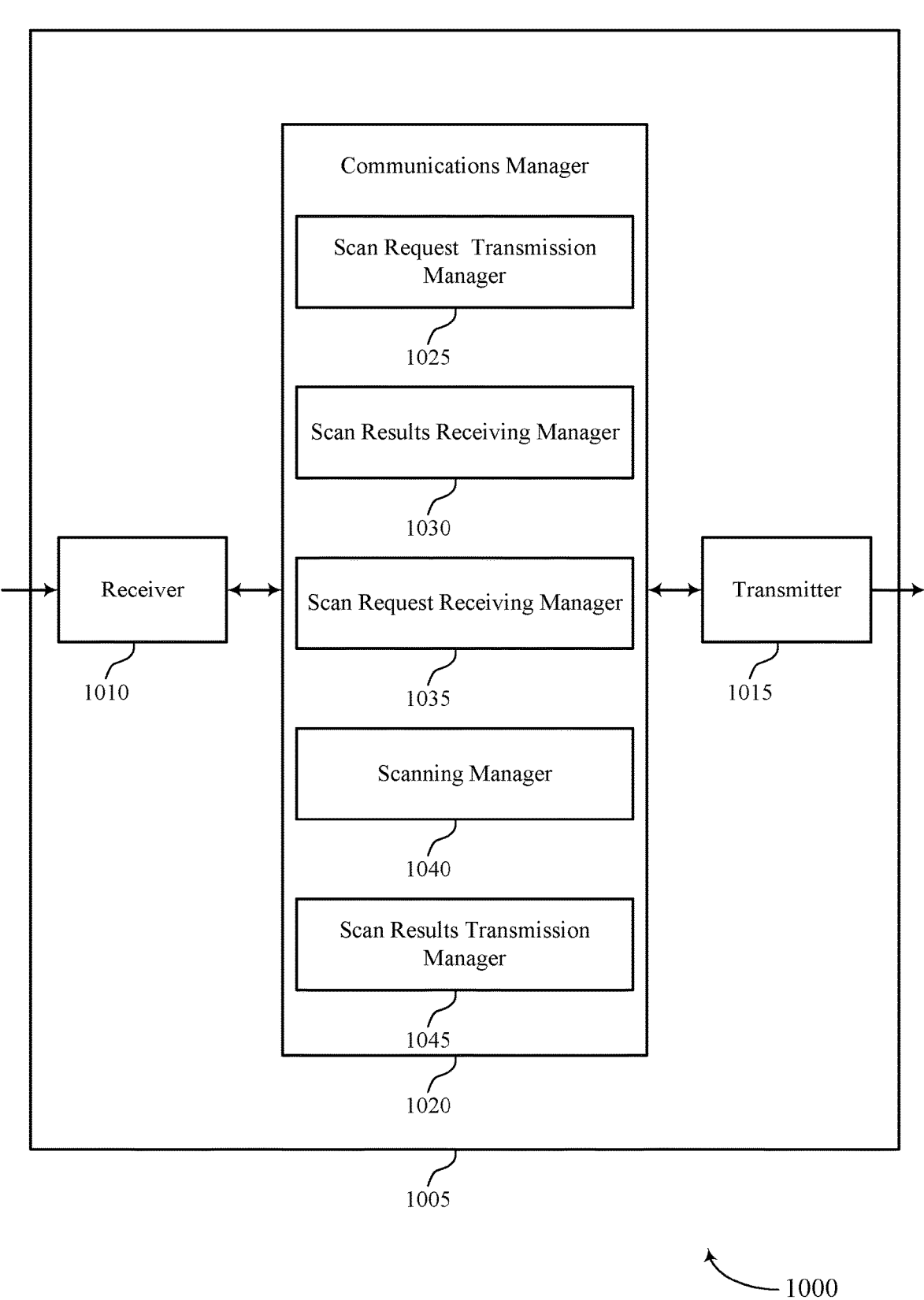

FIG. 10 illustrates a block diagram 1000 of a device 1005 that supports methods for distributed WLAN scan for low latency applications may be examples of a first wireless communication device or a second wireless communication device. The device 1005 may be an example of aspects of a device 905 or an STA 104 as described herein. The device 1005 may include a receiver 1010, a transmitter 1015, and a communications manager 1020. The device 1005 may also include a processor. Each of these components may be in communication with one another (such as, via one or more buses).

The receiver 1010 may provide a means for receiving information such as packets, user data, control information, or any combination thereof associated with various information channels (such as, control channels, data channels, information channels related to distributed WLAN scan for low latency applications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (such as, control channels, data channels, information channels related to distributed WLAN scan for low latency applications). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of distributed WLAN scan for low latency applications as described herein. For example, the communications manager 1020 may include a scan request transmission manager 1025, a scan results receiving manager 1030, a scan request receiving manager 1035, a scanning manager 1040, a scan results transmission manager 1045, or any combination thereof. The communications manager 1020 may be an example of aspects of a communications manager 920 as described herein. In some examples, the communications manager 1020, or various components thereof, may be configured to perform various operations (such as, receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a first wireless communication device in accordance with examples as disclosed herein. The scan request transmission manager 1025 may be configured as or otherwise support a means for responsive to detecting a second wireless communication device in communication with the first wireless communication device on a wireless communication link is within a threshold proximity of the first wireless communication device, transmitting, to the second wireless communication device, control signaling for the second wireless communication device to scan a subset of channels of a set of channels. The scan results receiving manager 1030 may be configured as or otherwise support a means for receiving, from the second wireless communication device on the wireless communication link, at least one result of scanning the subset of channels.

Additionally, or alternatively, the communications manager 1020 may support wireless communications at a second wireless communication device in accordance with examples as disclosed herein. The scan request receiving manager 1035 may be configured as or otherwise support a means for receiving, from a first wireless communication device in communication with the second wireless communication device on a wireless communication link and within a threshold proximity of the second wireless communication device, control signaling for the second wireless communication device to scan a subset of channels of a set of channels associated with communications between the first wireless communication device and an access point. The scanning manager 1040 may be configured as or otherwise support a means for scanning the subset of channels. The scan results transmission manager 1045 may be configured as or otherwise support a means for transmitting, to the first wireless communication device on the wireless communication link, at least one result of scanning the subset of channels.

Figure 11:
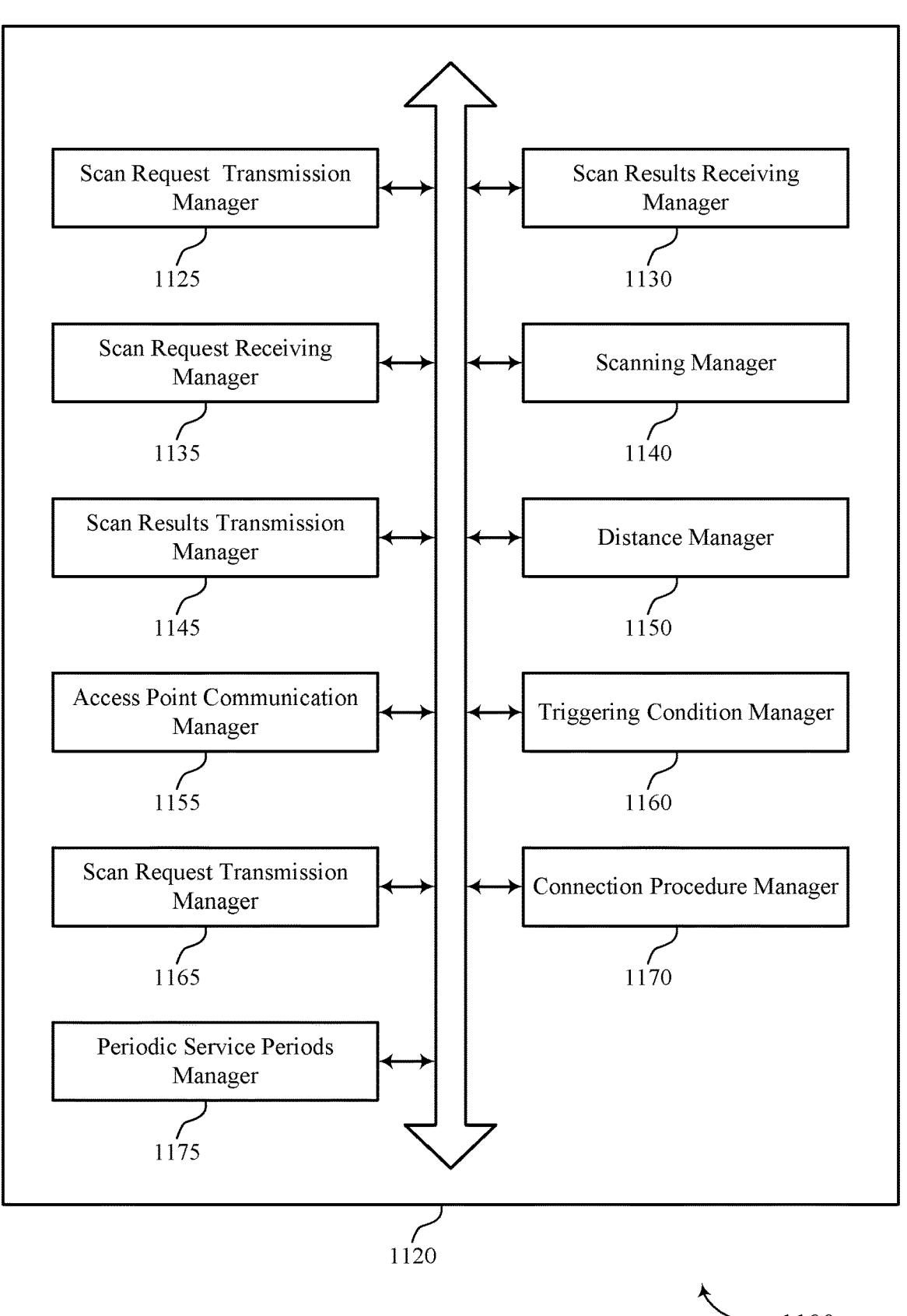
FIG. 11 illustrates a block diagram of a communications manager that supports methods for distributed WLAN scan for low latency applications and may support communications at a first wireless communication device and communications at a second wireless communication device.

FIG. 11 illustrates a block diagram 1100 of a communications manager 1120 that supports methods for distributed WLAN scan for low latency applications and may support communications at a first wireless communication device and communications at a second wireless communication device. The communications manager 1120 may be an example of aspects of a communications manager 920, a communications manager 1020, or both, as described herein. The communications manager 1120, or various components thereof, may be an example of means for performing various aspects of distributed WLAN scan for low latency applications as described herein. For example, the communications manager 1120 may include a scan request transmission manager 1125, a scan results receiving manager 1130, a scan request receiving manager 1135, a scanning manager 1140, a scan results transmission manager 1145, a distance manager 1150, an access point communication manager 1155, a triggering condition manager 1160, a scan request transmission manager 1165, a connection procedure manager 1170, a periodic service periods manager 1175, or any combination thereof. Each of these components may communicate, directly or indirectly, with one another (such as, via one or more buses).

The communications manager 1120 may support wireless communications at a first wireless communication device in accordance with examples as disclosed herein. The scan request transmission manager 1125 may be configured as or otherwise support a means for responsive to detecting a second wireless communication device in communication with the first wireless communication device on a wireless communication link is within a threshold proximity of the first wireless communication device, transmitting, to the second wireless communication device, control signaling for the second wireless communication device to scan a subset of channels of a set of channels. The scan results receiving manager 1130 may be configured as or otherwise support a means for receiving, from the second wireless communication device on the wireless communication link, at least one result of scanning the subset of channels.

In some examples, to support detecting that the second wireless communication device is with the threshold proximity, the distance manager 1150 may be configured as or otherwise support a means for receiving an indication that a measured RSSI value associated with a transmission from the second wireless communication device satisfies a threshold level.

In some examples, the scan request receiving manager 1135 may be configured as or otherwise support a means for receiving, from an access point, a request to scan the set of channels, where the control signaling is transmitted to the second wireless communication device in response to a triggering condition including the request to scan the set of channels.

In some examples, the access point communication manager 1155 may be configured as or otherwise support a means for communicating on a second wireless communication link with an access point, the set of channels being associated with the second wireless communication link. In some examples, the triggering condition manager 1160 may be configured as or otherwise support a means for identifying that a signal strength associated with the second wireless communication link between the first wireless communication device and the access point is below a threshold level, the triggering condition including the identification that the signal strength associated with the second wireless communication link is below the threshold level, and the set of channels being associated with the second wireless communication link.

In some examples, the scanning manager 1140 may be configured as or otherwise support a means for scanning a second subset of channels of the set of channels, the second subset of channels different from the subset of channels.

In some examples, the set of channels includes at least two of a set of 2 GHz channels, a set of 5 GHz channels, and a set of 6 GHz channels. In some examples, the subset of channels includes one of the set of 2 GHz channels, the set of 5 GHz channels, or the set of 6 GHz channels. In some examples, the second subset of channels includes a different one of the set of 2 GHz channels, the set of 5 GHz channels, or the set of 6 GHz channels. In some examples, the third subset of channels includes a different one of the set of 2 GHz channels, the set of 5 GHz channels, or the set of 6 GHz channels.

In some examples, to support communication on the wireless communication link with the second wireless communication device, the periodic service periods manager 1175 may be configured as or otherwise support a means for communicating with the second wireless communication device during periodic service periods in accordance with a service interval, the service interval including periodic service periods and periodic idle periods, and scanning the second subset of channels includes scanning the second subset of channels during the periodic idle periods.

In some examples, the scan request transmission manager 1165 may be configured as or otherwise support a means for responsive to detecting a third wireless communication device in communication with the first wireless communication device on a third wireless communication link is within the threshold proximity of the first wireless communication device, transmitting, to the third wireless communication device and in response to the triggering condition, second control signaling indicating for the third wireless communication device to scan a third subset of channels of the set of channels, the third subset of channels different from the subset of channels. In some examples, the scan results receiving manager 1130 may be configured as or otherwise support a means for receiving, from the third wireless communication device on the wireless communication link, at least one result of scanning the third subset of channels.

In some examples, the connection procedure manager 1170 may be configured as or otherwise support a means for identifying a channel of the set of channels to initiate a connection procedure in response to the at least one result of scanning the subset of channels.

In some examples, the second wireless communication device is a wearable device.

In some examples, the at least one result of scanning the subset of channels includes a respective RSSI value associated with each of the subset of channels.

In some examples, the set of channels are associated with communications between the first wireless communication device and an access point.

In some examples, the distance manager 1150 may be configured as or otherwise support a means for receiving an indication of a quantity of wireless communication devices in communication with the first wireless communication device within the threshold proximity of the first wireless communication device, a quantity of channels within the subset of channels responsive to the quantity of wireless communication devices.

In some examples, the scan request transmission manager 1165 may be configured as or otherwise support a means for transmitting, to the second wireless communication device and in response to the at least one result of scanning the subset of channels, third control signaling for the second wireless communication device to scan a fourth subset of channels of the set of channels. In some examples, the scan results receiving manager 1130 may be configured as or otherwise support a means for receiving, from the second wireless communication device on the wireless communication link, at least one result of scanning the fourth subset of channels.

Additionally, or alternatively, the communications manager 1120 may support wireless communications at a second wireless communication device in accordance with examples as disclosed herein. The scan request receiving manager 1135 may be configured as or otherwise support a means for receiving, from a first wireless communication device in communication with the second wireless communication device on a wireless communication link and within a threshold proximity of the second wireless communication device, control signaling for the second wireless communication device to scan a subset of channels of a set of channels associated with communications between the first wireless communication device and an access point. The scanning manager 1140 may be configured as or otherwise support a means for scanning the subset of channels. The scan results transmission manager 1145 may be configured as or otherwise support a means for transmitting, to the first wireless communication device on the wireless communication link, at least one result of scanning the subset of channels.

In some examples, to support communication on the wireless communication link with the first wireless communication device, the periodic service periods manager 1175 may be configured as or otherwise support a means for communicating with the first wireless communication device during periodic service periods in accordance with a service interval, the service interval including periodic service periods and periodic idle periods, and scanning the subset of channels includes scanning the subset of channels during the periodic idle periods.

In some examples, to support scanning the subset of channels, the scanning manager 1140 may be configured as or otherwise support a means for determining a respective RSSI associated with each of the subset of channels, the at least one result of scanning the subset of channels including the respective RSSI associated with each of the subset of channels.

In some examples, the subset of channels includes at least one of a set of 2 GHz channels, a set of 5 GHz channels, or a set of 6 GHz channels.

In some examples, the second wireless communication device is a wearable device.

In some examples, the scan request receiving manager 1135 may be configured as or otherwise support a means for receiving, from the first wireless communication device and in response to transmission of the at least one result of scanning the subset of channels, third control signaling for the second wireless communication device to scan a fourth subset of channels of the set of channels. In some examples, the scan results transmission manager 1145 may be configured as or otherwise support a means for transmitting, to the first wireless communication device on the wireless communication link, at least one result of scanning the fourth subset of channels.

Figure 12:
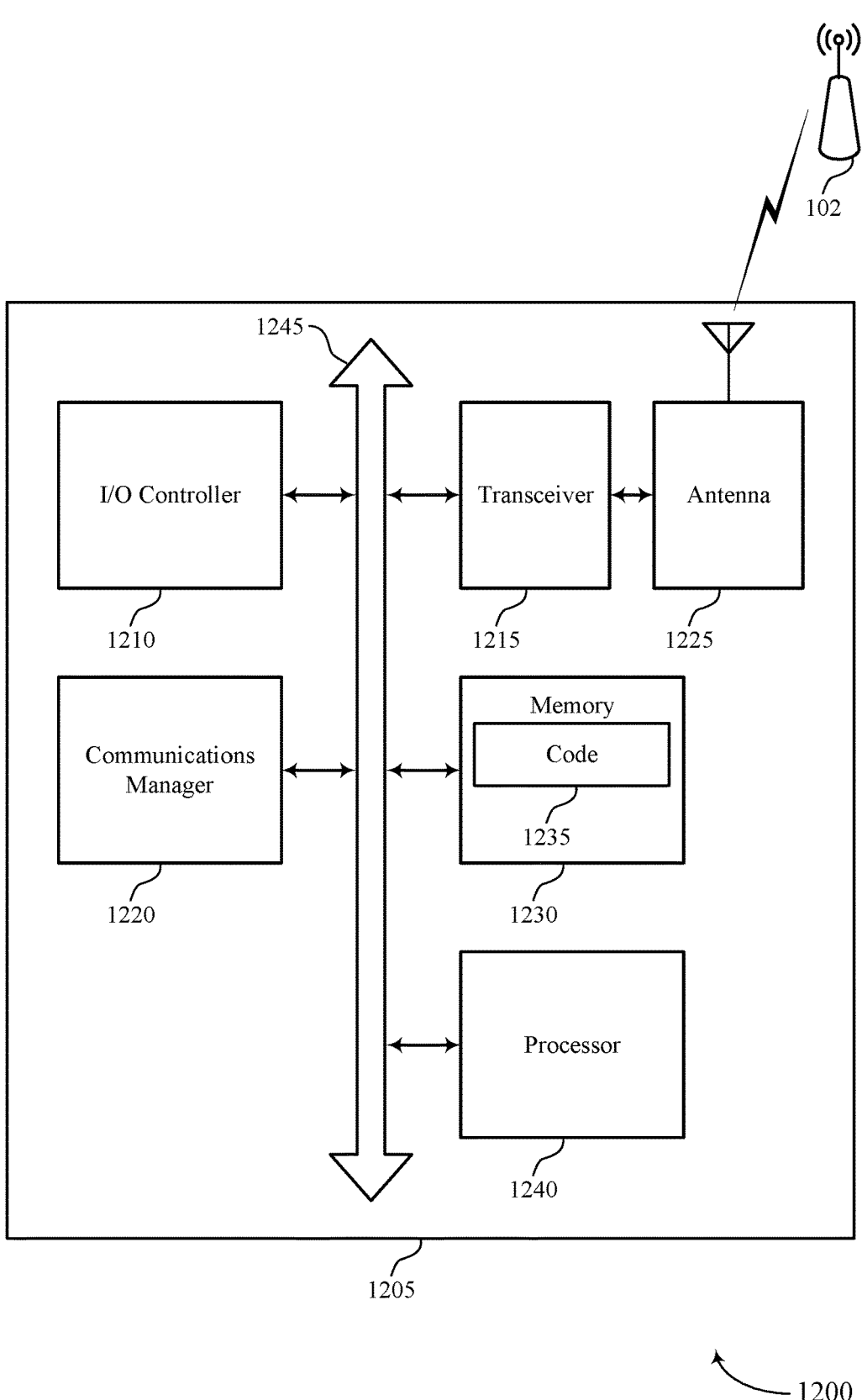
FIG. 12 illustrates a diagram of a system including a device that supports methods for distributed WLAN scan for low latency applications and may support communications at a first wireless communication device and communications at a second wireless communication device.

FIG. 12 illustrates a diagram of a system 1200 including a device 1205 that supports methods for distributed WLAN scan for low latency applications and may support communications at a first wireless communication device and communications at a second wireless communication device. The device 1205 may be an example of or include the components of a device 905, a device 1005, or an STA as described herein. The device 1205 may include components for bi-directional voice and data communications including components for transmitting and receiving communications, such as a communications manager 1220, an I/O controller 1210, a transceiver 1215, an antenna 1225, a memory 1230, code 1235, and a processor 1240. These components may be in electronic communication or otherwise coupled (such as, operatively, communicatively, functionally, electronically, electrically) via one or more buses (such as, a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. In some other cases, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets and provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. In some cases, the memory 1230 may contain, among other things, a BIOS which may control basic hardware or software operation such as the interaction with peripheral components or devices.

The processor 1240 may include an intelligent hardware device, (such as, a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (such as, the memory 1230) to cause the device 1205 to perform various functions (such as, functions or tasks supporting distributed WLAN scan for low latency applications). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communications at a first wireless communication device in accordance with examples as disclosed herein. For example, the communications manager 1220 may be configured as or otherwise support a means for responsive to detecting a second wireless communication device in communication with the first wireless communication device on a wireless communication link is within a threshold proximity of the first wireless communication device, transmitting, to the second wireless communication device, control signaling for the second wireless communication device to scan a subset of channels of a set of channels. The communications manager 1220 may be configured as or otherwise support a means for receiving, from the second wireless communication device on the wireless communication link, at least one result of scanning the subset of channels.

Additionally, or alternatively, the communications manager 1220 may support wireless communications at a second wireless communication device in accordance with examples as disclosed herein. For example, the communications manager 1220 may be configured as or otherwise support a means for receiving, from a first wireless communication device in communication with the second wireless communication device on a wireless communication link and within a threshold proximity of the second wireless communication device, control signaling for the second wireless communication device to scan a subset of channels of a set of channels associated with communications between the first wireless communication device and an access point. The communications manager 1220 may be configured as or otherwise support a means for scanning the subset of channels. The communications manager 1220 may be configured as or otherwise support a means for transmitting, to the first wireless communication device on the wireless communication link, at least one result of scanning the subset of channels.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, longer battery life, improved utilization of processing capability.

FIG. 13 illustrates a flowchart showing a method 1300 that supports distributed WLAN scan for low latency applications using a first wireless communication device. The operations of the method 1300 may be implemented by an STA or its components as described herein. For example, the operations of the method 1300 may be performed by an STA as described with reference to FIGS. 1 through 12. In some examples, an STA may execute a set of instructions to control the functional elements of the STA to perform the described functions. Additionally, or alternatively, the STA may perform aspects of the described functions using special-purpose hardware.

At 1305, the method may include responsive to detecting a second wireless communication device in communication with the first wireless communication device on a wireless communication link is within a threshold proximity of the first wireless communication device, transmitting, to the second wireless communication device, control signaling for the second wireless communication device to scan a subset of channels of the set of channels. The operations of 1305 may be performed in accordance with examples as disclosed herein. In some examples, aspects of the operations of 1305 may be performed by a scan request transmission manager 1125 as described with reference to FIG. 11.

At 1310, the method may include receiving, from the second wireless communication device on the wireless communication link, at least one result of scanning the subset of channels. The operations of 1310 may be performed in accordance with examples as disclosed herein. In some examples, aspects of the operations of 1310 may be performed by a scan results receiving manager 1130 as described with reference to FIG. 11.

FIG. 14 illustrates a flowchart showing a method 1400 that supports distributed WLAN scan for low latency applications using a second wireless communication device. The operations of the method 1400 may be implemented by an STA or its components as described herein. For example, the operations of the method 1400 may be performed by an STA as described with reference to FIGS. 1 through 12. In some examples, an STA may execute a set of instructions to control the functional elements of the STA to perform the described functions. Additionally, or alternatively, the STA may perform aspects of the described functions using special-purpose hardware.

At 1405, the method may include receiving, from a first wireless communication device in communication with the second wireless communication device on a wireless communication link and within a threshold proximity of the second wireless communication device, control signaling for the second wireless communication device to scan a subset of channels of a set of channels associated with communications between the first wireless communication device and an access point. The operations of 1405 may be performed in accordance with examples as disclosed herein. In some examples, aspects of the operations of 1405 may be performed by a scan request receiving manager 1135 as described with reference to FIG. 11.

At 1410, the method may include scanning the subset of channels. The operations of 1410 may be performed in accordance with examples as disclosed herein. In some examples, aspects of the operations of 1410 may be performed by a scanning manager 1140 as described with reference to FIG. 11.

At 1415, the method may include transmitting, to the first wireless communication device on the wireless communication link, at least one result of scanning the subset of channels. The operations of 1415 may be performed in accordance with examples as disclosed herein. In some examples, aspects of the operations of 1415 may be performed by a scan results transmission manager 1145 as described with reference to FIG. 11.

The following provides an overview of aspects of the present disclosure:

Aspect 1: A method for wireless communications at a first wireless communication device, comprising: responsive to detecting a second wireless communication device in communication with the first wireless communication device on a wireless communication link is within a threshold proximity of the first wireless communication device, transmitting, to the second wireless communication device, control signaling for the second wireless communication device to scan a subset of channels of a set of channels; and receiving, from the second wireless communication device on the wireless communication link, at least one result of scanning the subset of channels.

Aspect 2: The method of aspect 1, wherein the detecting that the second wireless communication device is with the threshold proximity comprises: receiving an indication that a measured RSSI value associated with a transmission from the second wireless communication device satisfies a threshold level.

Aspect 3: The method of any of aspects 1 through 2, further comprising: receiving, from an AP, a request to scan the set of channels, the control signaling is transmitted to the second wireless communication device in response to a triggering condition comprising the request to scan the set of channels.

Aspect 4: The method of any of aspects 1 through 3, further comprising: communicating on a second wireless communication link with an AP, the set of channels being associated with the second wireless communication link; and responsive to identifying that a signal strength associated with the second wireless communication link between the first wireless communication device and the AP is below a threshold level, the triggering condition comprising the identification that the signal strength associated with the second wireless communication link is below the threshold level, and the set of channels being associated with the second wireless communication link.

Aspect 5: The method of any of aspects 1 through 4, further comprising: scanning a second subset of channels of the set of channels, the second subset of channels different from the subset of channels.

Aspect 6: The method of aspect 5, wherein the set of channels comprises at least two of a set of 2 GHz channels, a set of 5 GHz channels, and a set of 6 GHz channels, the subset of channels comprises one of the set of 2 GHz channels, the set of 5 GHz channels, or the set of 6 GHz channels, the second subset of channels comprises a different one of the set of 2 GHz channels, the set of 5 GHz channels, or the set of 6 GHz channels and the third subset of channels comprises a different one of the set of 2 GHz channels, the set of 5 GHz channels, or the set of 6 GHz channels.

Aspect 7: The method of any of aspects 5 through 6, wherein communication on the wireless communication link with the second wireless communication device comprises: communicating with the second wireless communication device during periodic service periods in accordance with a service interval, the service interval comprising periodic service periods and periodic idle periods, and scanning the second subset of channels comprises scanning the second subset of channels during the periodic idle periods.

Aspect 8: The method of any of aspects 1 through 7, further comprising: responsive to detecting a third wireless communication device in communication with the first wireless communication device on a third wireless communication link is within the threshold proximity of the first wireless communication device, transmitting, to the third wireless communication device and in response to the triggering condition, second control signaling indicating for the third wireless communication device to scan a third subset of channels of the set of channels, the third subset of channels different from the subset of channels; and receiving, from the third wireless communication device on the wireless communication link, at least one result of scanning the third subset of channels.

Aspect 9: The method of any of aspects 1 through 8, further comprising: identifying a channel of the set of channels to initiate a connection procedure within response to the at least one result of scanning the subset of channels.

Aspect 10: The method of any of aspects 1 through 9, wherein the second wireless communication device is a wearable device.

Aspect 11: The method of any of aspects 1 through 10, wherein the at least one result of scanning the subset of channels comprises a respective RSSI value associated with each of the subset of channels.

Aspect 12: The method of any of aspects 1 through 11, wherein the set of channels are associated with communications between the first wireless communication device and an AP.

Aspect 13: The method of any of aspects 1 through 12, further comprising: receiving an indication of a quantity of wireless communication devices in communication with the first wireless communication device within the threshold proximity of the first wireless communication device, a quantity of channels within the subset of channels responsive to the quantity of wireless communication devices.

Aspect 14: The method of any of aspects 1 through 13, further comprising: transmitting, to the second wireless communication device and in response to the at least one result of scanning the subset of channels, third control signaling for the second wireless communication device to scan a second fourth of channels of the set of channels; and receiving, from the second wireless communication device on the wireless communication link, at least one result of scanning the fourth subset of channels.

Aspect 15: A method for wireless communications at a second wireless communication device, comprising: receiving, from a first wireless communication device in communication with the second wireless communication device on a wireless communication link and within a threshold proximity of the second wireless communication device, control signaling for the second wireless communication device to scan a subset of channels of a set of channels associated with communications between the first wireless communication device and an AP; scanning the subset of channels; and transmitting, to the first wireless communication device on the wireless communication link, at least one result of scanning the subset of channels.

Aspect 16: The method of aspect 15, wherein communication on the wireless communication link with the first wireless communication device comprises: communicating with the first wireless communication device during periodic service periods in accordance with a service interval, the service interval comprising periodic service periods and periodic idle periods, and scanning the subset of channels comprises scanning the subset of channels during the periodic idle periods.

Aspect 17: The method of any of aspects 15 through 16, wherein scanning the subset of channels comprises: identifying a respective RSSI associated with each of the subset of channels, the at least one result of scanning the subset of channels comprising the respective RSSI associated with each of the subset of channels.

Aspect 18: The method of any of aspects 15 through 17, wherein the subset of channels comprises at least one of a set of 2 GHz channels, a set of 5 GHz channels, or a set of 6 GHz channels.

Aspect 19: The method of any of aspects 15 through 18, wherein the second wireless communication device is a wearable device.

Aspect 20: The method of any of aspects 15 through 19, further comprising: receiving, from the first wireless communication device and in response to transmission of the at least one result of scanning the subset of channels, third control signaling for the second wireless communication device to scan a fourth subset of channels of the set of channels; and transmitting, to the first wireless communication device on the wireless communication link, at least one result of scanning the fourth subset of channels.

Aspect 21: An apparatus for wireless communications at a first wireless communication device, comprising a processor; memory coupled with the processor; and instructions stored in the memory and executable by the processor to cause the apparatus to perform a method of any of aspects 1 through 14.

Aspect 22: An apparatus for wireless communications at a first wireless communication device, comprising at least one means for performing a method of any of aspects 1 through 14.

Aspect 23: A non-transitory computer-readable medium storing code for wireless communications at a first wireless communication device, the code comprising instructions executable by a processor to perform a method of any of aspects 1 through 14.

Aspect 24: An apparatus for wireless communications at a second wireless communication device, comprising a processor; memory coupled with the processor; and instructions stored in the memory and executable by the processor to cause the apparatus to perform a method of any of aspects 15 through 20.

Aspect 25: An apparatus for wireless communications at a second wireless communication device, comprising at least one means for performing a method of any of aspects 15 through 20.

Aspect 26: A non-transitory computer-readable medium storing code for wireless communications at a second wireless communication device, the code comprising instructions executable by a processor to perform a method of any of aspects 15 through 20.

It should be noted that the methods described herein describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 and 200 of FIGS. 1 and 2—may include one or more carriers, where each carrier may be a signal made up of multiple sub-carriers (such as, waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (such as, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the term "determine" or "determining" encompasses a wide variety of actions and, therefore, "determining" can include calculating, computing, processing, deriving, investigating, looking up (such as via looking up in a table, a database or another data structure), identifying, inferring, ascertaining, measuring, and the like. Also, "determining" can include receiving (such as receiving information or receiving an indication), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A first wireless communication device, comprising:
    one or more transceivers; and
    at least one processor and at least one memory that stores code executable by the at least one processor to cause the first wireless communication device to:
        responsive to detection that a second wireless communication device in communication with the first wireless communication device on a wireless communication link is within a threshold proximity of the first wireless communication device, transmit, via the one or more transceivers, to the second wireless communication device, control signaling for the second wireless communication device to scan a subset of channels of a set of channels in response to a triggering condition, wherein the triggering condition comprises a request from an access point to scan the set of channels or a signal strength associated with a second wireless communication link between the first wireless communication device and the access point is below a threshold level; and
        receive, via the one or more transceivers, from the second wireless communication device on the wireless communication link, at least one result of scanning the subset of channels.

2. The first wireless communication device of claim 1, wherein the at least one processor is further configured to cause the first wireless communication device to:
    receive, via the one or more transceivers, an indication that a measured received signal strength indicator value associated with a transmission from the second wireless communication device satisfies a threshold level, the detection that the second wireless communication device is with the threshold proximity comprising reception of the indication.

3. The first wireless communication device of claim 1, wherein the at least one processor is further configured to cause the first wireless communication device to:
    receive, via the one or more transceivers from the access point, the request to scan the set of channels.

4. The first wireless communication device of claim 3, wherein the at least one processor is further configured to cause the first wireless communication device to:
    communicate, via the one or more transceivers, on the second wireless communication link with the access point, the set of channels being associated with the second wireless communication link; and
    identify that a signal strength associated with the second wireless communication link between the first wireless communication device and the access point is below the threshold level, and the set of channels being associated with the second wireless communication link.

5. The first wireless communication device of claim 1, wherein the at least one processor is further configured operable to cause the first wireless communication device to:
    scan, via the one or more transceivers, a second subset of channels of the set of channels, the second subset of channels different from the subset of channels.

6. The first wireless communication device of claim 5, wherein the at least one processor is further configured to cause the first wireless communication device to:
    responsive to detection that a third wireless communication device in communication with the first wireless communication device on a third wireless communication link is within the threshold proximity of the first wireless communication device, transmit, via the one or more transceivers, to the third wireless communication device second control signaling indicating for the third wireless communication device to scan a third subset of channels of the set of channels, the third subset of channels different from the subset of channels; and
    receive, from the third wireless communication device on the wireless communication link, at least one result of scanning the third subset of channels.

7. The first wireless communication device of claim 6, wherein:
    the set of channels comprises at least two of a set of 2 GHz channels, a set of 5 GHz channels, and a set of 6 GHz channels,
    the subset of channels comprises one of the set of 2 GHz channels, the set of 5 GHz channels, or the set of 6 GHz channels,
    the second subset of channels comprises a different one of the set of 2 GHz channels, the set of 5 GHz channels, or the set of 6 GHz channels, and
    the third subset of channels comprises a different one of the set of 2 GHz channels, the set of 5 GHz channels, or the set of 6 GHz channels.

8. The first wireless communication device of claim 5, wherein the at least one processor is configured to cause the first wireless communication device to communicate on the wireless communication link with the second wireless communication device further configured to cause the first wireless communication device to:

communicate, via the one or more transceivers, with the second wireless communication device during periodic service periods in accordance with a service interval, the service interval comprising periodic service periods and periodic idle periods, and scanning the second subset of channels comprises scanning the second subset of channels during the periodic idle periods.

9. The first wireless communication device of claim 1, wherein the at least one processor is further configured to cause the first wireless communication device to:

identify a channel of the set of channels to initiate a connection procedure within response to the at least one result of scanning the subset of channels.

10. The first wireless communication device of claim 1, wherein the second wireless communication device is a wearable device.

11. The first wireless communication device of claim 1, wherein the at least one result of scanning the subset of channels comprises a respective received signal strength indicator value associated with each of the subset of channels.

12. The first wireless communication device of claim 1, wherein the set of channels are associated with communications between the first wireless communication device and an access point.

13. The first wireless communication device of claim 1, wherein the at least one processor is further configured to cause the first wireless communication device to:

receive, via the one or more transceivers, an indication of a quantity of wireless communication devices in communication with the first wireless communication device within the threshold proximity of the first wireless communication device, a quantity of channels within the subset of channels responsive to the quantity of wireless communication devices.

14. The first wireless communication device of claim 1, wherein the at least one processor is further configured to cause the first wireless communication device to:

transmit, via the one or more transceivers, to the second wireless communication device and in response to the at least one result of scanning the subset of channels, third control signaling for the second wireless communication device to scan a fourth subset of channels of the set of channels; and receive, via the one or more transceivers, from the second wireless communication device on the wireless communication link, at least one result of scanning the fourth subset of channels.

15. A second wireless communication device, comprising: one or more transceivers; and at least one processor and at least one memory that stores code executable by the at least one processor to cause the second wireless communication device to:

receive, via the one or more transceivers, from a first wireless communication device in communication with the second wireless communication device on a wireless communication link and within a threshold proximity of the second wireless communication device, control signaling for the second wireless communication device to scan a subset of channels of a set of channels associated with communications between the first wireless communication device and an access point in response to a triggering condition, wherein the triggering condition comprises a request from an access point to scan the set of channels or a signal strength associated with a second wireless communication link between the first wireless communication device and the access point is below a threshold level;

scan, via the one or more transceivers, the subset of channels; and transmit, via the one or more transceivers, to the first wireless communication device on the wireless communication link, at least one result of scanning the subset of channels.

16. The second wireless communication device of claim 15, wherein the at least one processor is further configured to cause the second wireless communication device to:

communicate, via the one or more transceivers, with the first wireless communication device during periodic service periods in accordance with a service interval, the service interval comprising periodic service periods and periodic idle periods, and scanning the subset of channels comprises scanning the subset of channels during the periodic idle periods.

17. The second wireless communication device of claim 15, wherein the at least one processor is further configured to cause the second wireless communication device to:

identify a respective received signal strength indicator associated with each of the subset of channels, the at least one result of scanning the subset of channels comprising the respective received signal strength indicator associated with each of the subset of channels.

18. The second wireless communication device of claim 15, wherein the subset of channels comprises at least one of a set of 2 GHz channels, a set of 5 GHz channels, or a set of 6 GHz channels.

19. The second wireless communication device of claim 15, wherein the second wireless communication device is a wearable device.

20. The second wireless communication device of claim 15, wherein the at least one processor is further configured to cause the second wireless communication device to:

receive, via the one or more transceivers, from the first wireless communication device and in response to transmission of the at least one result of scanning the subset of channels, third control signaling for the second wireless communication device to scan a fourth subset of channels of the set of channels; and transmit, via the one or more transceivers, to the first wireless communication device on the wireless communication link, at least one result of scanning the fourth subset of channels.

21. A method for wireless communication by a first wireless communication device, comprising:

responsive to detecting a second wireless communication device in communication with the first wireless communication device on a wireless communication link is within a threshold proximity of the first wireless communication device, transmitting, to the second wireless communication device, control signaling for the second wireless communication device to scan a subset of channels of a set of channels in response to a triggering condition, wherein the triggering condition comprises a request from an access point to scan the set of channels or a signal strength associated with a second wireless communication link between the first wireless communication device and the access point is below a threshold level; and receiving, from the second wireless communication device on the wireless communication link, at least one result of scanning the subset of channels.

22. The method of claim 21, wherein the detecting that the second wireless communication device is with the threshold proximity comprises:

receiving an indication that a measured received signal strength indicator value associated with a transmission from the second wireless communication device satisfies a threshold level.

23. The method of claim 21, further comprising:

communicating on the second wireless communication link with the access point, the set of channels being associated with the second wireless communication link; and identifying that a signal strength associated with the second wireless communication link between the first wireless communication device and the access point is below the threshold level, and the set of channels being associated with the second wireless communication link.

24. The method of claim 21, further comprising:

scanning a second subset of channels of the set of channels, the second subset of channels different from the subset of channels.

25. The method of claim 24, further comprising:

responsive to detecting a third wireless communication device in communication with the first wireless communication device on a third wireless communication link is within the threshold proximity of the first wireless communication device, transmitting, to the third wireless communication device, third control signaling indicating for the third wireless communication device to scan a third subset of channels of the set of channels, the third subset of channels different from the subset of channels; and receiving, from the third wireless communication device on the wireless communication link, at least one result of scanning the second subset of channels.

26. The method of claim 24, wherein communication on the wireless communication link with the second wireless communication device comprises:

communicating with the second wireless communication device during periodic service periods in accordance with a service interval, the service interval comprising periodic service periods and periodic idle periods, and scanning the second subset of channels comprises scanning the second subset of channels during the periodic idle periods.

27. A method for wireless communication by a second wireless communication device, comprising:

receiving, from a first wireless communication device in communication with the second wireless communication device on a wireless communication link and within a threshold proximity of the second wireless communication device, control signaling for the second wireless communication device to scan a subset of channels of a set of channels associated with communications between the first wireless communication device and an access point in response to a triggering condition, wherein the triggering condition comprises a request from an access point to scan the set of channels or a signal strength associated with a second wireless communication link between the first wireless communication device and the access point is below a threshold level;

scanning the subset of channels; and transmitting, to the first wireless communication device on the wireless communication link, at least one result of scanning the subset of channels.

28. The method of claim 27, wherein communication on the wireless communication link with the first wireless communication device comprises:

communicating with the first wireless communication device during periodic service periods in accordance with a service interval, the service interval comprising periodic service periods and periodic idle periods, and scanning the subset of channels comprises scanning the subset of channels during the periodic idle periods.

29. The method of claim 27, wherein scanning the subset of channels comprises:

identifying a respective received signal strength indicator associated with each of the subset of channels, the at least one result of scanning the subset of channels comprising the respective received signal strength indicator associated with each of the subset of channels.

30. The method of claim 27, further comprising:

receiving, from the first wireless communication device and in response to transmission of the at least one result of scanning the subset of channels, third control signaling for the second wireless communication device to scan a fourth subset of channels of the set of channels; and transmitting, to the first wireless communication device on the wireless communication link, at least one result of scanning the fourth subset of channels.

* * * * *